(12) United States Patent
Kirmuss

(10) Patent No.: US 6,624,611 B2
(45) Date of Patent: Sep. 23, 2003

(54) SENSING VEHICLE BATTERY CHARGING AND/OR ENGINE BLOCK HEATING TO TRIGGER PRE-HEATING OF A MOBILE ELECTRONIC DEVICE

(75) Inventor: Charles Bruno Kirmuss, Bayfield, CO (US)

(73) Assignee: Taw Security Concepts, Inc., Wheat Ridge, CO (US)

( * ) Notice: Subject to any disclaimer, the term of this patent is extended or adjusted under 35 U.S.C. 154(b) by 0 days.

(21) Appl. No.: 10/216,313

(22) Filed: Aug. 9, 2002

(65) Prior Publication Data

US 2003/0080713 A1 May 1, 2003

Related U.S. Application Data

(60) Provisional application No. 60/335,943, filed on Oct. 30, 2001.

(51) Int. Cl.$^7$ .................................................. H02J 7/00
(52) U.S. Cl. ...................................................... 320/104
(58) Field of Search ................................. 320/104, 107, 320/110; 348/61, 143, 149, 148, 151, 158, 352, 376; 224/924, 929, 917.5; 455/575, 90; 386/1, 107; 701/36, 10, 65; 374/10, 20; 361/687

(56) References Cited

U.S. PATENT DOCUMENTS

| | | | | |
|---|---|---|---|---|
| 4,949,186 A | * | 8/1990 | Peterson | 386/5 |
| 5,704,212 A | * | 1/1998 | Erler et al. | 361/687 |
| 6,292,213 B1 | * | 9/2001 | Jones | 348/61 |
| 6,393,357 B1 | * | 5/2002 | Holmes et al. | 701/115 |

OTHER PUBLICATIONS

Panasonic GP–US502 3–CCD Micro Head Color Video Camera, 3 pages.*

* cited by examiner

*Primary Examiner*—Edward H. Tso
*Assistant Examiner*—Pia Tibbits
(74) *Attorney, Agent, or Firm*—Mitchell Silberberg & Knupp LLP

(57) ABSTRACT

Provided is an apparatus that includes temperature-sensitive functional means for performing pre-configured functionality (such as video recording), mounting means for mounting the apparatus to a motor vehicle, and heating means for heating the functional means. Detection means detects at least one of: whether an automobile battery in the automobile is being charged and whether an engine block in the automobile is being heated. Control means controls the heating means and initiates a heating process upon detection by the detection means.

13 Claims, 12 Drawing Sheets

VIDEO RECORDING OPERATION

RING BUGGER OPERATION
(ONE RING OPERATING PER CONNECTED CAMERA)

SENSING VEHICLE BATTERY CHARGING AND/OR ENGINE BLOCK HEATING TO TRIGGER PRE-HEATING OF A MOBILE ELECTRONIC DEVICE

The present application claims priority to U.S. Provisional Patent Application Ser. No. 60/335,943 filed Oct. 30, 2001, and titled "Mobile Digital Video and Audio Recording Device", which application is incorporated herein by reference as though set forth herein in full.

BACKGROUND OF THE INVENTION

1. Field of the Invention

The present invention relates to pre-heating of a mobile electronic device, such as a video recorder used in a police car.

2. Description of the Related Art

Mobile Digital Video Recording System

Currently, the videocassette recorder (VCR) is the prime instrument for recording and capturing real-time video for evidentiary purposes in both fixed and mobile applications. One such mobile application is the recording of video captured by one or more cameras mounted in a police car or on a police motorcycle. Such video can provide useful evidence of traffic stops, car chases and other police activity for later use in court proceedings.

Conventionally, a standard VCR has been used for such mobile video-capture needs. Typically, in such cases the VCR is coupled with a DC to AC converter to provide power to the device and is housed in a box with a fan and filter set to provide cooling. In fact, in law-enforcement vehicles such VCR-based recording systems commonly are used. Because continuous operation of a VCR recorder generally provides only six to eight hours of recording time before a tape change is required, because law enforcement vehicles can be on the road for considerably more than six to eight hours, and also because of the costs of recording, archiving and reviewing full-time recordings generally are thought to be prohibitive, incident-only recording procedures commonly are used. Typically, incident recording is triggered when the police officer activates the siren or the chase lights, when the air bag in the vehicle is deployed or when the officer manually pushes a button to start the system. As used herein, the term "chase lights" is intended to mean flashing lights used by emergency response vehicles, such as patrol cars, ambulances or fire trucks, to indicate a chase or emergency situation.

Other mobile recording systems have been proposed and/or implemented. However, each utilizes either full-time recording or event-based recording. As indicated above there are significant problems with full-time recording. One problem with event-based recording is that some valuable evidence might not be recorded.

Heating and Cooling of a Mobile Video Recorder

A common conventional application of mobile video recording is the recording of video captured by one or more cameras mounted in a police car or on a police motorcycle. Such video can provide useful evidence of traffic stops, car chases and other police activity for later use in court proceedings. Typically, a standard videocassette recorder (VCR) is used for such purposes, although other recording systems also have been proposed and/or implemented.

Unfortunately, VCRs and other devices do not operate very well, if at all, at high temperatures, and might even become damaged if operation is attempted under such circumstances. Similarly, VCR-based and other recording systems do not operate well and/or may become damaged at very low temperatures, e.g. at or below 30° F. Accordingly, both VCR-based systems and PC (personal computer)-based systems include fans and filters installed in their respective system cabinet housings.

However, in most law enforcement applications, the recording system (either VCR-based and PC-based) is installed within the trunk due to the large size of the recorder and particular power supply. Rarely is the temperature of the space of trunks regulated, and internal temperatures in the unregulated trunk often rise to 150° F. or more. These extremely high temperatures are well beyond the ability of a fan alone to convection cool the recording system. In addition, it may be necessary to use a separate heating device if the recorder is to be used in a cold climate.

Event-Based Vehicle Image Capture

In the recent past, there has been an attempt to utilize automated systems in order to detect traffic violations (e.g., speeding) and then photograph the violator's license plate for the purpose of issuing a traffic citation or a warning letter. Unfortunately, timing the camera to photograph a vehicle's license plate at precisely the correct moment has proved to be quite difficult. In addition, early attempts to introduce VCR recording or film technology in such applications have not been successfully deployed, as in many instances the images captured of the event trigger also are not in synchronization or fast enough or have enough resolution to adequately capture the violator's license plate number.

Mobile Video Recorder Control and Interface

A common conventional application of mobile video recording is the recording of video captured by one or more cameras mounted in a police car or on a police motorcycle. Such video can provide useful evidence of traffic stops, car chases and other police activity for later use in court proceedings. Typically, a standard videocassette recorder (VCR) is used for such purposes, although other recording systems also have been proposed and/or implemented.

In such applications, it is common to utilize a dedicated control panel for operating the VCR or other recording device. However, this solution has the drawback that it requires additional space in the patrol car, a resource that is often in short supply. In addition, the present inventor has discovered that additional efficiencies can be obtained by interfacing the video recorder in such applications to other equipment in the patrol car.

Pre-Heating A Mobile Electronic Device

Many electronic devices have operating temperature ranges within which they can be operated properly and without causing damage to the device. Thus, without taking precautions the use of such devices in a mobile environment in a very cold climate can cause significant problems. Even if a heater is provided, such a heater typically would only be operated if the vehicle were in operation. As a result, at a minimum the user would have to wait until the temperature of the subject device came within the acceptable range, and the user might even be required to guess when that point occurred.

Mobile Digital Video Monitoring with Pre-Event Recording

Recently, there has been increased interest in monitoring events that occur on various forms of public transportation, such as airplanes, buses and trains. Currently, the videocassette recorder (VCR) is the prime instrument for recording and capturing real-time video for evidentiary purposes in both fixed and mobile applications. Unfortunately, the use of a VCR for such purposes has the drawbacks that it would be difficult to continuously replace the videocassette and that the storage, archiving and reviewing of such tapes would be costly.

Storage of Mobile Video Recorder Content

A common conventional application of mobile video recording is the recording of video captured by one or more cameras mounted in a police car or on a police motorcycle. Such video can provide useful evidence of traffic stops, car chases and other police activity for later use in court proceedings. In addition, recently there has been increased interest in monitoring events that occur on various forms of public transportation, such as airplanes, buses and trains. Typically, a standard videocassette recorder (VCR) is used for such purposes, although other recording systems also have been proposed and/or implemented.

In either event, the common technique for permanently storing such recorded video is to remove the media on which the video is recorded, label it and then store it in an appropriate facility. However, such techniques are cumbersome and costly, both in terms of the ongoing activity required to store such content and then again later when an individual wishes to locate and view a specific segment of the video. Additional authenticity and chain-of-custody problems also arise if the video is intended to be used as evidence in a courtroom.

Real-Time Operating System of Recording Device

Following the VCR-based recording systems, personal computer (PC)-based digital video recording systems have been commercialized. These PC-based systems typically use a Windows™ operating system on a PC motherboard powered via DC to AC converters, and include available video compression capture cards to record captured non-continuous (i.e., not perceptually continuous) video. That is, PC-based video recording is at frame rates of less than the 30 frames per second (fps), the rate that is generally considered to be appear continuous when viewed.

In addition to not having the availability of 30 fps recording, these PC-based systems have other drawbacks if used in mobile or otherwise harsh environments. In both mobile and stationary environments, power interruptions are common. Power interruptions of PC-based recording systems can cause recordings to stop. Such stops require manual intervention to reset the system as well as interceding with Windows™ Scandisk or manual Windows™ safe-mode intervention. These activities require human intervention, are time-consuming, and can be particularly difficult to perform in conjunction with police patrol, chase and arrest activity.

PC-based systems also traditionally utilize PCI slots and memory card slots, which accept "plug-in" IDE hard disk controller, video input capture and VGA output cards as well as RAM "Memory sticks". Any of these may come loose during use in a mobile environment.

Transmitter-Based Mobile Video Locating

Conventionally, police patrol cars and other vehicles have been equipped with in-vehicle video recording devices, such as videocassette-based recorders. Such conventional video recorders typically are connected to a single fixed video camera, usually mounted on the vehicle's dashboard and oriented so as to observe scenes out the front of the vehicle (i.e., through the windshield). While such an arrangement works fairly well in certain circumstances, such as where the patrol car is pursuing another vehicle, it is not able to detect all views that may be desirable during the course of a patrol.

Mobile Motor Vehicle Identification

Conventionally, law enforcement has relied on chance traffic stops and intuition of the individual police officer to identify suspects for further investigation during the course of a patrol. However, this method usually is very inefficient and its effectiveness varies widely from officer to officer.

SUMMARY OF THE INVENTION

Mobile Digital Video Recording with Pre-Event Recording

The present invention addresses the prior art problems by providing in-vehicle video recording with buffering for capturing video prior to a trigger event.

Thus, in one aspect the present invention is directed to a mobile event-recording device that includes distributed elements within, attached to or otherwise mounted to a mobile vehicle, with the principal elements being: a first camera providing a real-time video signal that corresponds to an observed outboard live-motion scene; and a digital video recorder receiving the video signal provided by the camera and recording the video signal in response to a trigger signal (e.g., an activation switch for a light bar or siren, an air bag sensor signal indicating air bag deployment, or depression of an emergency button or a dedicated recording activation switch). The video recorder uses a buffer to receive and store the video signal so as to preserve the video signal during a programmable sliding (or rolling) time interval prior to the triggering event. Thus, in response to provision of the trigger signal, at least a portion of the video signal stored in the buffer is preserved for recording by the video recorder on a hard disk (or other long-term storage medium) and thereafter, the video recorder records directly on the hard disk (or other long-term storage medium).

Optionally, a second camera, mounted on the vehicle may be used to provide outboard or inboard views, and provides a video signal to the digital signal recorder that subsequently is combined with the digital signal from the first camera (e.g., using multiplexing), compressed and recorded in response to the trigger signal. The buffer also receives and records the second video signal so as to preserve the second video signal during the sliding time interval. Thus, preferably at least a portion of the second video signal is stored in the buffer and, upon receipt of the trigger signal, recorded by the video recorder on a hard disk or other high-capacity storage medium. Audio inputs such as wired and/or wireless microphones are connectable to the video recorder for providing audio streams that are multiplexed, compressed and synchronized with their corresponding video signals. Camera priority and/or selection optionally are provided (e.g., in embodiments in which the device directionally locates a wireless microphone). The device further supports a general-purpose programmable computer terminal for controlling operation of the video recorder, generating trigger signals and/or providing text overlay data.

Heating and Cooling of a Mobile Video Recorder

The present invention addresses the prior art problems by utilizing a solid-state heat pump to heat and cool a mobile video recorder.

Thus, in one aspect the present invention is directed to a mobile event-recording device contained within an airtight chassis with its internal temperature regulated according to pre-programmable operational thresholds via a controller using a temperature sensor and a solid-state heat pump attached to or proximate with the chassis. The mobile event-recording device further includes multiplexors, compressors and a buffer for the temporary storage of video signals during a sliding time window for the recording of compressed digital video and audio onto a hard disk or other high-capacity long-term storage medium. With regard to the buffer, the device responds to receipt of a trigger signal by initiating live recording of the video signal by the video recorder and transferring the temporarily stored video signal to the storage means (or otherwise preserving the temporarily stored video signal for permanent storage).

The chassis of the device is attached in suspension, or otherwise isolation-mounted to, a mobile vehicle. The temperature sensor provides internal temperature indications as the basis for recording initiation and cessation, as well as for temperature maintenance; an external fan provides additional air cooling; and an internal fan provides for internal air circulation. The temperature detector preferably is mounted on a printed circuit board such that the flat side of an encasing TO-92 package is flush with the printed circuit board, with a coating of thermal grease between the flat side of the TO-92 package and the printed circuit board. Additionally, the recorder further provides an interface with a general-purpose computer.

Event-Based Vehicle Image Capture

The present invention addresses the prior art problems by utilizing a buffering technique to capture video of vehicles under certain triggering conditions.

Thus, in one aspect the present invention is directed to a system for identifying vehicles of traffic violators, the system having elements that include: a video camera for providing, in real-time, a video signal that represents plural sequential video image frames (either perceptually continuous video, such as 30 frames per second, or non-perceptually continuous video, such as 1–2 fps); a traffic violation detector (e.g., a radar gun, an in-ground loop, a pair of self-powered wireless transponders or transmitters, a camera-based speed detection system, or any other speed sensor) that provides a trigger signal (e.g., based on vehicle speed and detection of the state of a traffic signal); a video recorder that receives the video signal provided by the camera and records the video signal in a buffer until receipt of a trigger signal, at which point at least a portion of the video signal stored in the buffer is preserved for recording and direct real-time storage of the video signal to a hard drive, or other high-capacity storage medium, commences. As a result, the video signal is preserved during a pre-programmable sliding (or rolling) time interval prior to provision of the trigger signal.

The traffic violation detector might detect the speed of a ground vehicle using hardware such as a radar or laser transceiver using software thresholding for signals in the visual or infrared spectrum or in-ground loop or vehicle sense detectors coupled to a system controller. The system provides data from the detector to the buffer and to the video recorder in synchronization with the video signal. The system supports the inclusion of a second camera for providing a second video signal to the video recorder and to the buffer. The video recorder receives the second video signal and records the second video signal upon receipt of the trigger signal. In applications covering intersections, up to 4 cameras may record this video for analysis. The buffer also receives and records the second video signal so as to preserve the second video signal during the sliding time interval, and in response to provision of the trigger signal, at least a portion of the second video signal stored in the buffer means also is preserved for recording by the video recorder. As part of the implementation, at least one of the cameras preferably is positioned so as to capture a license plate of a passing vehicle, more preferably with one or additional cameras capturing and authenticating the identity of the driver and/or an overview of the entire scene.

Mobile Video Recorder Control and Interface

The present invention addresses the prior art problems by interfacing a general-purpose computer with a video recorded to control recording and playback operations of the video recorder.

Thus, in one aspect the present invention is directed to recording video in a mobile environment, in which camera means mounted at a first location in a vehicle generates a video signal based upon an observed scene. Video recording means mounted at a second location in the vehicle inputs and records the video signal on a tangible medium. General-purpose computing means, mounted at a third location in the vehicle and running a general operating system and user-installed application programs, communicates with the video recording means, is loaded with software to provide a user interface to control recording and playback by the video recording means, and includes means for wireless communication with a central base station.

By providing a user interface via a general-purpose computing means in this manner, the present invention often can reduce the amount of space required to be occupied by hardware in a police patrol car or in similar environments.

Pre-Heating A Mobile Electronic Device

The present invention addresses the prior art problems by initiating a pre-heating process when automobile battery charging or engine block heating is detected.

Thus, in one aspect the present invention is directed to an apparatus that includes temperature-sensitive functional means for performing pre-configured functionality (such as video recording), mounting means for mounting the apparatus to a motor vehicle, and heating means for heating the functional means. Detection means detects at least one of: whether an automobile battery in the automobile is being charged and whether an engine block in the automobile is being heated. Control means controls the heating means and initiates a heating process upon detection by the detection means.

In the foregoing manner, an electronic device is pre-heated under conditions where such pre-heating likely would be necessary.

Mobile Digital Video Monitoring with Pre-Event Recording

The present invention addresses the prior art problems by providing in-vehicle video recording with buffering for capturing the video prior to a trigger event.

Thus, in one aspect the present invention is directed to monitoring events on a transportation vehicle, in which camera means provides in real time a video signal that corresponds to an observed live-motion scene, is mounted in a vehicle at a first location and is oriented so as to detect scenes within the vehicle. Trigger means, positioned at a second location in the vehicle, provides a trigger signal to begin recording of the video signal. Video recording means mounted at a third location on the vehicle receives the video signal and records the video signal in response to the trigger signal. Buffer means receives and stores the video signal so as to preserve the video signal during a sliding time interval. The first location, second location and third location are all different, and in response to provision of the trigger signal at least a portion of the video signal stored in the buffer means is preserved for recording by the video recording means.

By utilizing buffering in the foregoing manner, it is possible to provide event-based video monitor recording while still capturing the video prior to the event. Moreover, by positioning the camera means, video recording means and trigger means at different locations in the vehicle, more flexibility often can be obtained.

In the preferred embodiments of the invention, up to 4 cameras may be used, as well as up to 8 alarm trigger inputs and/or use of integrated (e.g., internal to the video digitizer) video motion detection where changes in one or more specific areas within a camera's field of view over a static background are detected by the system.

Storage of Mobile Video Recorder Content

The present invention addresses the prior art problems by outputting stored video data via a data port mounted on a motor vehicle or to an external storage device via a wireless link.

Thus, in one aspect the present invention is directed to mobile digital video recording, in which storage means for stores digital data, input means inputs a video signal, recording means records the video signal in digital format to the storage means, mounting means mounts the apparatus at a first location in a motor vehicle, and output means outputs the video signal from the storage means to a data port mounted at a second location on the motor vehicle or to an external storage device via a wireless link.

By outputting a stored video signal in the foregoing manner, the present invention often can simplify the process of uploading and storing video data from a mobile digital video recorder.

Transmitter-Based Mobile Video Locating

The present invention addresses the problems of the prior art by providing techniques and systems in which a wireless transmitter is located and a camera is steered to that direction and/or a camera already oriented to observe that direction is selected for immediate viewing and/or recording.

Thus, in one aspect the present invention is directed to a system for mobile video monitoring that includes camera means mounted to a mobile vehicle for generating a video signal corresponding to an observed scene. Steering means (such as a motor) rotates the camera means into an orientation specified by a control signal, and an antenna means receives a wireless signal, the antenna means including multiple directional antennas, each oriented at a different angle. Processor means inputs the wireless signal from each of at least two of the directional antennas, determines a direction based upon a comparison of the wireless signals (e.g., the received signal powers) input from the plural directional antennas, and generates and outputs the control signal to rotate the camera means based on the comparison.

By virtue of the foregoing arrangement, it is generally possible to keep a video camera constantly oriented in the direction in which an officer, or other person having a transmitter, is located. In more particularized aspects of the invention, the direction information also is used to set other camera settings, such as focus and/or zoom.

In another aspect, the invention is directed to a system for mobile video monitoring, in which plural camera means are mounted to a mobile vehicle, each such camera means generating a video signal corresponding to an observed scene. An antenna means receives a wireless signal, the antenna means including multiple directional antennas, each oriented at a different angle. Processor means inputs the wireless signal from each of at least two of the directional antennas, determines a direction based upon a comparison of the wireless signals input from those directional antennas, and selects a signal from one of the plural camera means to display and/or record.

The foregoing arrangement also optimal viewing, but does not necessarily require a movable camera. It is noted that the camera selection technique described above may be combined with the camera steering technique described above to achieve in greater flexibility.

Regardless of which technique(s) are used, the camera steering and/or selection preferably are updated on an ongoing basis to reflect changing conditions. In addition, the transmitter locating may utilize historical angular measurements, as well as current measurements, such as by incorporating Kalman filtering.

Mobile Motor Vehicle Identification

The present invention addresses the prior art problems by providing an in-vehicle system for capturing video of license plates for different cars, processing the video to obtain textual data for the license plate numbers and comparing those numbers to an in-vehicle database to identify a target list of vehicles.

Thus, in one aspect the present invention is directed to an apparatus for identifying license plates, and includes camera means for generating a video signal corresponding to an observed scene, the camera means being mounted in a mobile vehicle and oriented so as to observe license plates of other vehicles. Processing means processes the video signal so as to obtain textual representations of vehicle license plate numbers in the video signal, and storage means stores a list of target vehicle license plate numbers. Comparison means compares the textual representations of vehicle license plate numbers in the video signal against the list of target vehicle license plate numbers to determine if there is a match, and then output means notifies a user of the match.

The foregoing arrangement often can, for example, provide an efficient way to identify vehicles that are wanted by law enforcement officers. In more particularized aspects of the invention, the foregoing arrangement includes and is integrated with a video recorder and also includes at least one additional camera. As a result, a significant amount of the video processing can be shared, thereby providing license plate identification capabilities to a video recorder often at little additional cost in terms of space, hardware and power consumption.

Comment Regarding Summaries

The foregoing summaries are intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Overview

Figure 1A:
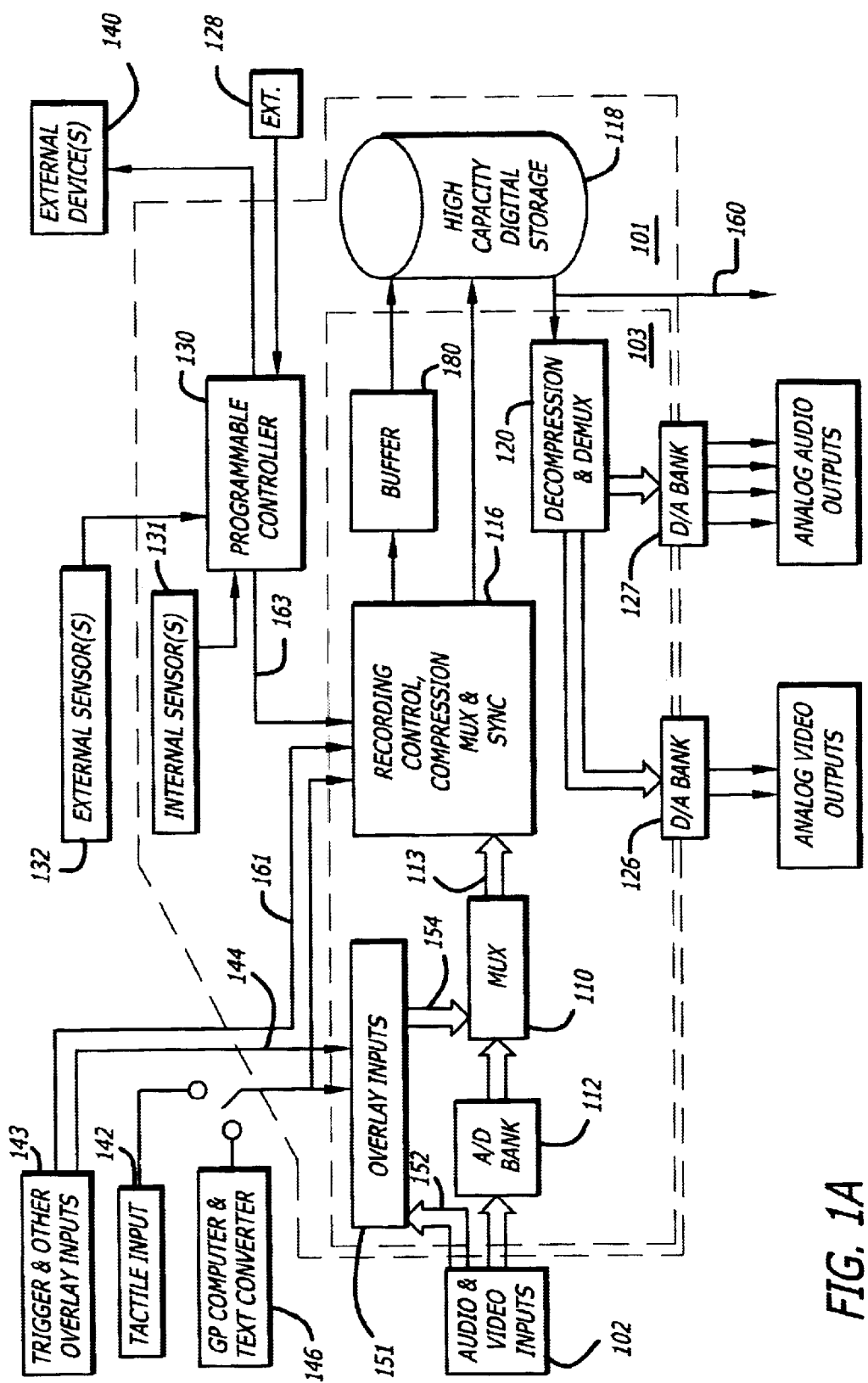
FIG. 1A is a functional block diagram of a video recording device according to a representative embodiment of the present invention.

The following description concerns various systems and methods pertaining to digital video recording for evidentiary and monitoring purposes, and also concerns related systems, methods and concepts that have uses in other contexts. An important application of the systems and methods described herein is to mobile vehicle-based video recording. However, other applications also are described herein, such as stationary recording of moving vehicles, and particularly recording of vehicle license plates and other identification information. Still other applications of the technology described herein will be readily apparent to those skilled in the art.

Multiple aspects of such video recording systems and methods are described below, with some of such different aspects being claimed in other patent applications. In this regard, commonly assigned patent applications titled "Mobile Digital Video Recording with Pre-Event Recording", "Heating and Cooling of a Mobile Video Recorder", "Event-Based Vehicle Image Capture", "Mobile Video Recorder Control and Interface", "Mobile Digital Video Monitoring with Pre-Event Recording", "Transmitter-Based Mobile Video Locating", "Mobile Motor Vehicle Identification" and "Storage of Mobile Video Recorder Content" are filed concurrently herewith, and each such application is incorporated by reference herein as though set forth herein in full. In order to provide a general understanding of at least some of such different aspects, an overview of a representative system will now be described.

This representative system is for use in a police patrol car and is intended to replace a conventional video recording system used in such a patrol car. The representative system of the present invention includes at least one or more video cameras either wired into the system or using a wireless link (one-way or two-way), a digital video recording device (preferably utilizing a hard disk for storage), an interface to the general-purpose computer that may or may not be in radio communication with a central base station (and which conventionally is provided in many such patrol cars), interfaces to other triggering devices (e.g., siren, light bar, air bag, vibration sensor) and/or switches for triggering permanent storage of the video signal(s), one or more audio input devices (e.g., wireless and/or hard-wired microphones) and a separate keypad for controlling the video recorder and/or video camera(s). The video recorder itself may or may not be suspension-mounted in the trunk of the vehicle, or mounted in any other appropriate area, and is provided with heating/cooling as described in more detail below. The video cameras are mounted to capture video out the front and/or rear windows of the vehicle and/or may be installed inside the vehicle looking at the rear seat or even mounted on a person using a wireless video link back to the recorder. The audio input devices may, in any combination, be fixedly mounted in the vehicle, worn by the officer, and/or provided as an output of the vehicle's two-way radio.

Different embodiments of the present invention employ different combinations of modes of operation. At the top level, the system may operate in a event-based recording mode, in which recording must be triggered by the occurrence of a specified event, or in a continuous recording mode, in which video and audio are continuously recorded onto a storage medium in a continuous loop with new data overwriting previously stored data on a first-in-first-out basis or in a method where once the disk if full, no re-writing occurs. During the event-based recording mode, the system can be in a standby mode where it is monitoring for a specified event to occur, but not recording, or in an actual recording mode where audio and video are actually being recorded to the storage medium for long-term storage. It is noted that standby mode preferably also includes buffering functionality (where a relatively small amount (e.g., a few seconds to 5 minutes) of audio and video data are written to a buffer on a continuous-loop basis in order to provide for pre-event recording capabilities (i.e., the buffering mode). In the following discussion, the term standby mode often is used interchangeably with buffering mode, although it should be understood that in each case standby mode can be provided with or without buffering.

Thus, the video recorder in this system preferably utilizes a ring buffer to continuously record, over a sliding (or rolling) time interval, multiple channels of video and audio provided by such video cameras and audio input devices. When a trigger signal is received to begin recording, the contents of the buffer are captured for permanent storage, and real-time recording of the audio and video is begun. As a result, a fixed interval of pre-recording occurs. The duration of this time interval preferably is fixed in the system's firmware, but the system may instead be configured such that the time interval can be set by the user, e.g., by setting the individual bits on a DIP switch, or at the time of installation when programming the system using the system's control interface, to select, e.g., from 0 to 255 seconds of pre-recording. The buffer preferably exists on the non-volatile memory of the recorder and, therefore, upon receipt of the trigger signal is transferred to the hard disk or designated for preservation (i.e., no further overwriting until its contents can be transferred to long-term storage) and then is transferred to the hard drive or other long-term storage device subsequently. However, the buffer instead may exist on the hard drive itself and, in such embodiments, therefore need only be designated for permanent storage upon occurrence of the trigger event.

In use, the patrol officer can control the operation of the video recorder (e.g., recording, playback, fast-forward, rewind, search, and any other conventional VCR functions) via an interface on the standard general-purpose computer included in his or her patrol car. As a result, it is possible to eliminate a separate controller keypad, thereby saving space in the patrol car. In addition, in certain embodiments of the invention video signals from the video recorder of the present invention can be played back on the monitor for the in-car general-purpose computer, thereby eliminating the need for a separate video recorder playback monitor.

Still further, the video recorder according to the present invention preferably is configured to accept data (e.g., officer badge number, car number, Global Positioning System (GPS) data, real-time clock data or other textual data) from the general-purpose computer and to synchronize (where necessary) and record that data with the recorded video signal(s). The recording of such additional data, together with the video signal, often can provide a more complete picture of a sequence of events, on a second-by-second basis, upon later review of the recorded video. Digital signals from the general-purpose computer (e.g., when the officer enters an emergency code) also can be used to trigger the beginning of the video recording mode.

Again, it should be noted that the foregoing description is illustrative only. While this and similar examples may be referenced in the more detailed description below, such references are merely to facilitate the explanation of the invention, and are not intended to limit the invention to any particular embodiments.

General System Description

FIG. 1A is a functional block diagram of a recording device 101 according to a representative embodiment of the present invention. As shown in FIG. 1A, a plurality of analog video and one or more audio streams 102 are input into plurality of analog-to-digital converters (A/D) 112. After the bank of A/Ds 112, the digital signals are provided to a software-controlled multiplexor 110 that combines the digitized video streams into a single video stream and combines the digitized audio streams into a single audio stream, or that may be functionally bypassed to the extent only a single video stream or a single audio stream is input. In the preferred embodiment, where up to eight video streams from eight different sources are accommodated, the multiplexor 110 provides modes for: (i) combining multiple video frames (each from a different source) into a single frame, (ii) interleaving frames from the different sources, and (iii) camera switching, with the particular mode being selected by the recording control processor 116 (described in more detail below).

Preferably, recording and compression processor 116 is implemented on a single board 103 that also includes the bank of A/Ds 112, multiplexor 110, decompressor and demultiplexor 120, a bank of video digital-to-analog (D/A) converters 126, a bank of audio digital-to-analog (D/A) converters 127, and a microprocessor, with supporting random access memory (RAM) and read-only memory (ROM), running a real-time operating system and executing a wavelet compression technique and other processing described herein, based on computer-executable process steps stored in ROM. Generally speaking, processor 116 functions as the central controller of system 101, inputting audio and video signals, compressing them, combining such signals with other input data (e.g., overlay input signals 144 or data from general-purpose computer 146), and controlling how and when such signals are stored to and read from buffer 180 and storage device 118. Preferably, buffer 180 is implemented in non-volatile random access memory (RAM), while storage device 118 is implemented as a hard disk drive. In various embodiments of the invention, processor 116 also manages and controls other internal and/or external sensors and devices (e.g., for purposes of temperature maintenance of system 101). This and other processing performed by recording and compression processor 116 are described in more detail below.

Figure 1B:
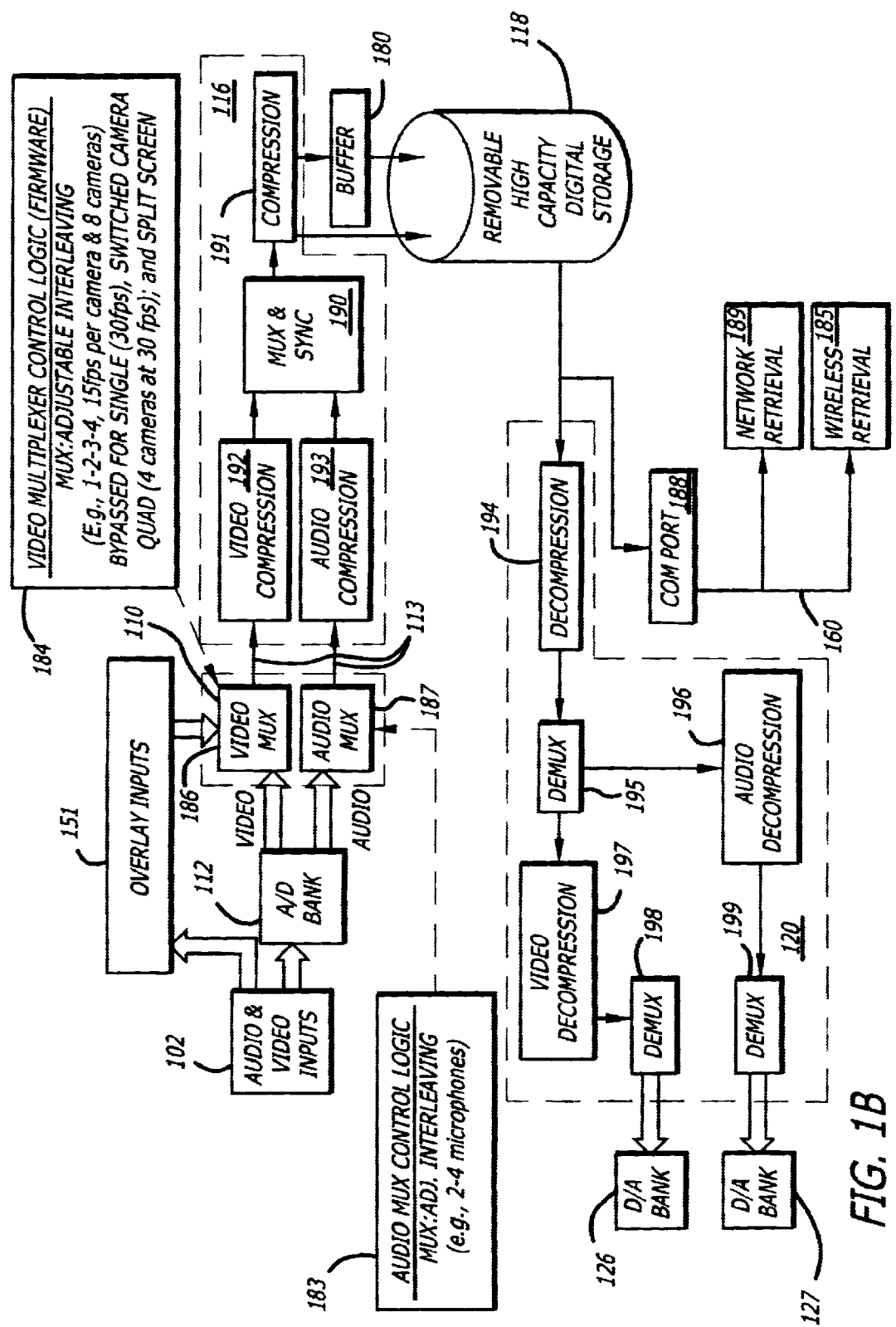
FIG. 1B is a block diagram illustrating more detail regarding certain components of a video processing and recording/retrieval control board according to a representative embodiment of the invention.

FIG. 1B is a block diagram illustrating more detail regarding certain components of board 103. As shown in FIG. 1B, in the recording and compression processor 116, the multiplexed or directly fed (in the event multiplexor 110 is bypassed) video and audio signals 113 are compressed separately 192, 193 and then the two streams are multiplexed with audio synchronization maintained 190 before additional compression 191 and subsequent recording into buffer 180 and/or onto high-capacity storage medium 118. Any known techniques for synchronizing audio and video may be utilized in the present invention and, accordingly, such synchronization is not discussed in detail here. Video, audio and/or other data stored on the storage medium 118 are retrievable within the recording device 101 via decompression 194, a demultiplexing of the combined audio and video signals 195, and separate audio decompression (expansion) 196 and video decompression (expansion) 197 before conversion to analog signals, as described in more detail below.

The compressed signal output from compression processor 116 of the compression processing card 103 is transmitted for storage within a buffer 180 and, upon detection of a trigger signal 161, within a high-capacity digital storage medium 118. Buffer 180 is configured as a ring buffer that stores input data over a sliding or rolling time interval. More specifically, as data initially are input, they are stored within buffer 180. Then, when buffer 180 is filled to capacity newly input data overwrite previously stored data on a first-in-first-out basis. As a result, buffer 180 continuously stores current data for the past t seconds, where t is determined based on the size of buffer 180 and the rate of data input. Upon detection of a trigger signal 161, recording and compression processor 116 causes the data within buffer 180 to be transferred to long-term storage 118. As noted above, upon such a detection, recording and compression processor 116 also causes newly input data (after compression) to be stored directly into high-capacity digital storage device 118 on a real-time basis. As a result, storage device 118 will store video and audio signals from the triggering point forward and also will store video and audio for t seconds prior to the triggering event.

In an alternate embodiment of the invention, buffer 180 is implemented on the same storage medium as device 118; thus, upon detection of a trigger signal 161, rather than a physical transfer, it is only necessary to designate the current contents of buffer 180 for permanent storage (i.e., no further overwriting) and to link such data to the post-triggering-event data being stored in real time into storage device 118. When recording with respect to the current event has completed and system 101 resumes standby operation, recording and compression processor 116 simply designates a different portion of the storage device 118 to be used as buffer 180.

As noted above, in the preferred embodiments buffer 180 is in fact be implemented within a separate storage device (e.g., non-volatile RAM) and the contents thereof are transferred to storage device 118 upon the detection of a trigger signal 161. In the event that immediate transfer of such data is not possible (e.g., due to the real-time recording to storage device 118), the contents of buffer 180 may be designated for preservation (i.e., no overwriting) until the transfer can actually take place.

Preferably, storage device 118 is implemented as a removable hard disk, but instead may be implemented as any other recordable medium, such as any other magnetically (e.g., magnetic tape) or any optically (e.g., CD-ROM or DVD) recordable medium. Storage device 118 preferably is removable so that the contents thereof can be transferred to another device or so that the medium comprising device 180 can be archived. Alternatively, the contents of device 180 may be downloaded to another device either via a wireless link or a hard-wired interface, as described in more detail below.

Any known techniques may be used for the compression and corresponding decompression, synchronization, A/D conversion and D/A conversion functions mentioned above.

However, in the preferred embodiment wavelet compression is used. Also, it should be noted that digital video and/or audio signals may be directly input into system 101, thereby obviating the need for the A/Ds 112 and the D/As 126 and 127. Still further, the compression may be performed on each signal prior to multiplexing, rather than in the order described above, thereby simplifying the compression processing when certain multiplexing modes have been selected.

Returning to FIG. 1A, for playback purposes the compressed video and audio are decompressed, or otherwise expanded, and de-multiplexed 120 for analog output via a bank of video D/As 126 and a bank of audio D/As 127, respectively. Alternatively, the video and audio signals may be output in a digital format 160, e.g., for storage or for playback through a digital player.

Programmable parameters 128 pertinent to video and audio recording (e.g., pre- and post-event recording) are entered via and processed by a programmable controller 130, which then outputs control signals 163 that start and stop operation of recording and compression processor 116. Preferably, controller 130 includes: (i) DIP-switches for allowing a user to input at least one of such parameters 128, (ii) inputs for external sensor 132 signals, and (iii) inputs for internal sensor 131 signals. Thus, for example, the DIP switches may be used to control the length of time that system 101 continues to operate after ignition is turned off (e.g., 8 switches for selecting 0 to 255 seconds of pre-recording), as described in more detail below. The sensor 131 and/or 132 input signals might be used to disable recording under specified conditions (e.g., in the event that one of such sensors determines that the internal temperature of system 101 is outside of a prescribed operational range) and/or for operational control (e.g., for maintaining the internal temperature of system 101). The signals output by controller 130 instruct processor 116 when to begin recording data to storage device 118 and to buffer 180 and to what addresses the data should be written. In the preferred embodiment of the invention, the programmable controller 130 also controls external devices 140 (such as a Peltier element for heating and cooling system 101).

The recording processor 116 inputs: (i) data from a touch-screen, a keyboard/keypad and/or any other tactile input device(s) 142; (ii) trigger signals 161; and (iii) programmable parameter outputs of the programmable controller 130. Overlay input signals 144 (e.g., chase-light-on indicator or siren-on indicator), touch-screen, other keyboard/keypad or other tactile inputs 142, and inputs from general-purpose computer 146 are combined 151 (either directly, in the case of textual input data or after conversion into text or other symbols in overlay processor 151) with the video inputs 152, while trigger signals 161 and certain signals from terminal 146 are input to the compression processor 116 to trigger transition to the recording mode from the standby mode (which preferably includes buffering). With regard to data overlay in element 151, input text data may be converted into bitmap format and then superimposed on the input video signals 102, while input binary signals (e.g., for siren on/off) may be first converted to text (e.g., "Siren On") and then converted to bitmap format and superimposed in element 151.

Terminal 146 may be implemented as a commercially available laptop or similar portable general-purpose computer. As such, it typically will include, for example, at least some of the following components: one or more central processing units (CPUs), read-only memory (ROM), random access memory (RAM), input/output circuitry for interfacing with other devices and for connecting to one or more networks, a display (such as a TFT display), other output devices (such as a speaker), one or more input devices (such as a touch-screen or other pointing device, keyboard, microphone or scanner), a mass storage unit (such as a hard disk drive), a real-time clock, and a removable storage read/write device (such as for reading from and/or writing to a magnetic disk, a magnetic tape, an opto-magnetic disk, an optical disk, or the like). Preferably, terminal 146 interfaces with system 101 via a serial port, such as its RS-232, RS-422 or Universal Serial Bus (USB) port. Typically, terminal 146 will be running a Microsoft Windows or similar general operating system, although other operating systems may instead be used.

In addition, in the preferred embodiments of the invention terminal 146 is radio-linked to a central base station, allowing the user to transmit and receive digital information, subject to bandwidth limitations. The software loaded on terminal 146 preferably includes software to provide a user interface for operating video recording system 101 (or 200), allowing the user to view video played back from storage device 118, and to start, stop, rewind, fast-forward, pause and search such video, and to perform other functions similar to those provided by conventional videocassette recorders. Accordingly, the police officer or other user may review recorded video and audio on-site in order to quickly obtain information during the occurrence of an incident. Moreover, unlike conventional videocassette recorders, a system of the present invention preferably can provide for: (i) index-based searching of specific portions of the audio/video based on the recorded input signals such as "siren on", or "chase lights on" or "brakes on"; (ii) faster transitions from one video segment to another, particularly when such segments were recorded a significant amount of time apart; and (iii) insignificant delays between reviewing and recording (e.g., because there is no need to fast forward to the correct position to begin recording) and even simultaneous reviewing and recording.

Preferably, signals from terminal 146 automatically will cause initiation of the recording mode. For instance, if an officer inputs an emergency code for transmission to the central base station, the software loaded on terminal 146 automatically also generates a signal instructing processor 116 to start the recording mode.

In operation, an input trigger signal 161 (or a trigger signal from terminal 146) causes recording processor 116 to switch into recording mode, i.e., to preserve the contents of buffer 180 and to begin recording input video and audio in real time to storage device 118. Processor 116 may cause system 101 to return to standby mode (e.g., recording to buffer 180 only) in response to the input trigger signal 161 turning off, an input signal indicating a manual switching back to standby mode or the expiration of a predetermined period of time, depending upon the mode of operation. In the event of the input trigger signal 161 turning off, the firmware driving processor 116 preferably includes instructions to continue in the recording mode for a period of time after the occurrence of such event, e.g., the period of time set in the system's firmware.

As indicated above, a video recording system 101 according to the present invention contemplates the use of multiple video and, in some cases, multiple audio input signals. In the event that multiple video and audio input devices are in fact connected to system 101, the input signals from all such devices may be recorded. On the other hand, the user may be allowed to manually designate the input devices whose output signals will be recorded. Still further, the input devices whose output signals will be recorded may be automatically selected.

Transmitter-Based Mobile Video Locating

For example, if a police officer is wearing a wireless microphone (or other, e.g., infrared, transmitter), multiple directional antennas may be utilized to determine the direction in which the officer is located. Such multiple directional antennas may be placed on top of a patrol car, each oriented at a different angle, together covering the entire 360° around the vehicle, and with adjacent antennas' reception beams overlapping, such that a signal emanating from any point around the vehicle will be received by two of the antennas. In this manner, the actual direction can be determined by comparing the signal power received at each of the two antennas in relation to the antennas' beam shapes. Thus, for example, if the received signal power is the same at each of the two adjacent antennas then the direction is determined to be midway between the orientations of the two antennas that received the signal. On the other hand, if one antenna receives more signal power than the other, a weighted average of the two angular orientations of the two antennas is used, with the weights being determined based on the beam shapes of the two antennas. Moreover, once an angular direction for the transmitter has been measured, that measurement can be combined with prior measurements (e.g., using a Kalman filter) to reduce errors and provide a more accurate estimation of the true direction to the transmitter.

In any event, either manual or automatic designation of fewer than all connected input devices can reduce the amount of data required to be stored. In further embodiments of the invention, one or more of such directional antennas may be steerable, either by mechanical means (e.g., motor-driven) and/or electronically (e.g., using an antenna array) and driven by appropriate tracking software or firmware so as to track the location of the wireless microphone.

In still further embodiments of the invention, a system may be provided with one or more motor-driven rotatable video cameras in which the motor is provided with control signals from system 101 (e.g., processor 116). Such a camera preferably is mounted on top of the patrol car, although it might instead be mounted at any other position on or in the patrol car or other vehicle. In such embodiments, information regarding the direction in which the officer is located (e.g., determined in the manner described in the preceding paragraph) is used to point the rotatable video camera in the direction of the officer (thereby maintaining the camera in the best possible orientation at all times).

Thus, the present invention provides for camera selection and camera steering based on direction information obtained by locating a transmitter. These techniques can be combined in embodiments where multiple cameras are provided, at least one of which being steerable, so as to achieve optimal results. In any event the steps of angle detection, filtering with historical measurements (if used), and antenna steering and/or selection are repeated on an ongoing basis to adjust to changing conditions (e.g., movement of the transmitter).

Irrespective of whether any camera is rotatable, in certain embodiments of the invention the direction information generated as indicated above is used for other purposes, such as to determine the distance of the officer from the camera (e.g., in connection with a laser range finder or by means of triangulation) for purposes of setting the camera's focus and/or magnification (i.e., zoom) to an optimal setting.

Real-Time Operating System

The preferred system embodiment of the invention uses embedded software such as a real-time operating system (RTOS), so that there is no PC or Windows™-based operating system to support. The RTOS of the present invention preferably is comprised of a kernel and a shell. The shell is the outermost part of the RTOS that interacts with user commands. The kernel is the essential center of the compression computer operating system and, as the core, it provides basic services for all other parts of the RTOS. Generally, the kernel includes an interrupt handler that handles all requests or completed I/O operations, i.e., system calls, that compete for the kernel's services, a scheduler that selects and schedules programs to share the kernel's processing time, and a supervisor that provides resource oversight of the computer to each process when it is scheduled. The kernel also includes a manager of the RTOS's address spaces in memory or storage, sharing these among all components and other users of the kernel's services. Although the kernel can meet the requirements of a RTOS, device drivers (e.g., for the IDE hard drive 118) and the like, as required, generally motivate the inclusion and use of the shell.

Because the system 101 uses a RTOS, power interruptions that would cause a general operating system to create temporary files, and perhaps require a system reset, generally do not affect the system using its RTOS. One or more high-capacity digital storage units, such as a removable integrated drive electronics (IDE) hard drive 118, is in communication with the video compressor 103 for storing digital video and audio data received from the video compressor 210. As will be described below, a continuous recording of pre-event video and audio is accomplished by using a buffer 180 (e.g., a separate buffer or a portion of the hard drive 118).

Unlike PC-based operating systems, the RTOS of the present invention does not utilize a Peripheral Component Interconnect (PCI) bus or any other shared bus, but rather utilizes direct point-to-point connections. Absent the bandwidth bottleneck of the PCI bus (approximately 133 megabits per second), system 101 is able to process 30 fps video signals in real time. In addition, the signal processing functionality of system 101 preferably is mainly implemented using dedicated hardware components and some firmware, with no software that must be downloaded from a hard drive into RAM. For example, all or almost all of the device drivers utilized in a system of the present invention preferably are implemented in dedicated hardware. As a result, many of the temporary files created by a PC-based operating system become unnecessary in a system of the present invention.

Exemplary Embodiments

Several different embodiments of the foregoing system will now be described, with each embodiment targeted to a particular implementation scenario. In each such embodiment, different features and aspects of the present invention are described. However, it should be understood that the description of any feature or aspect in connection with any particular embodiment of the invention is for ease of explanation only and is not intended to limit that feature or aspect to such embodiment. Rather, it is contemplated that the various aspects and features of the present invention described herein may be applied in any of the different embodiments, with the actual implementations being dictated primarily by known cost/benefit tradeoffs in each instance.

Automobile (e.g., Patrol Car) Embodiment

Figure 2:
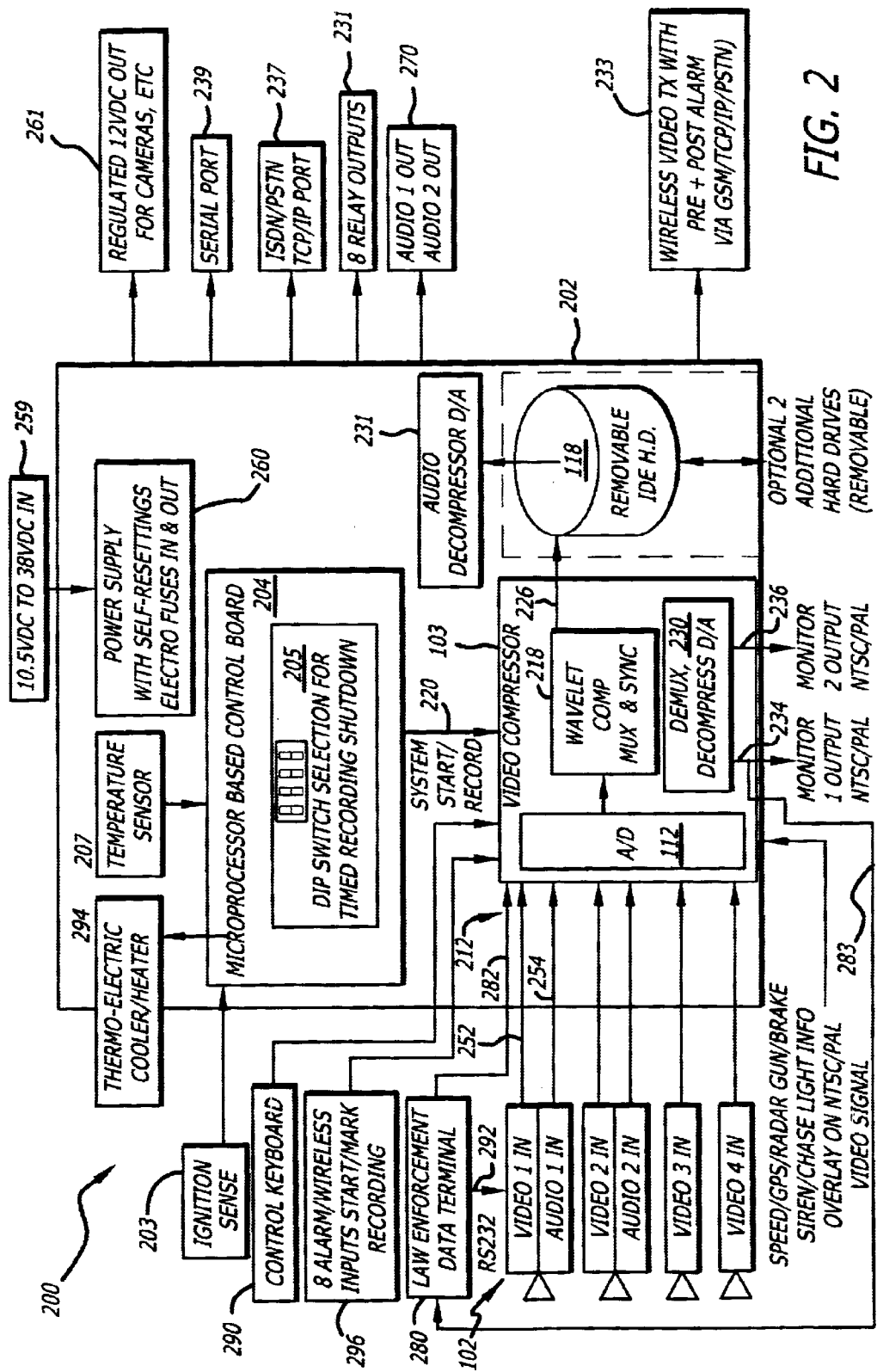
FIG. 2 is a block diagram illustrating a mobile digital video and audio recording system according to an automobile embodiment of the invention.

FIG. 2 illustrates a block diagram of a system 200 that reflects an adaptation of system 101 (shown in FIGS. 1A and 1B) for use in an automobile, such as a police patrol car, according to a representative embodiment of the invention. The system 200 includes a housing or cabinet 202 containing a microprocessor-based control board 204 that controls the overall operation of the system 200. The control board 204 receives inputs from external sensors such as ignition sense 203, engine block heater sense (not shown), battery charging sense (not shown) and sensors internal and/or external to the housing 202, such as a solid state temperature detector 207, and thereby monitors the environmental state of the system, both within the housing 202 and within the system's external environment.

The temperature detector 207 preferably is encased in a standard TO-92 package having a flat side, a rounded side, a bottom portion from which leads extend and a top portion which is at an opposite end from the bottom portion. More preferably, temperature detector 207 is mounted on a printed circuit board such that the flat side of the TO-92 package is flush with the printed circuit board, and has an optional coating of thermal grease between the flat side of the TO-92 package and the printed circuit board to increase thermal conductivity.

The system further includes a video compression device 218 (which preferably is similar or identical to processor 116) for receiving and compressing video or both video and audio signals in communication with the microprocessor-based control board 204. In one embodiment, the video compression device 218 is disposed on an electronics card 103 that also includes a bank of A/Ds 112 with a wavelet compression engine 218, a plurality of video D/As 126 controlled by software to expand or otherwise de-multiplex the compressed video signals in order to provide a plurality of monitor outputs such as monitor 1 output 234 and monitor 2 output 236, and at least one audio decompressor and D/A 231.

One or more video input channels and one or more audio input channels 102 are connected individually with the A/Ds through which video and audio signals are received from externally mounted video and audio capture devices. While FIG. 2 illustrates four video inputs and two audio inputs, an alternative embodiment has eight video inputs and four audio inputs. As part of the general compression 218, these video input signals 252 are multiplexed and the audio input signals 242 are multiplexed, compressed, jointly multiplexed with audio synchronization, and further compressed. A preferred video compression technique for the video compressor is wavelet-based compression.

In addition to video and audio input channels 102, the system of the ground carrier vehicle embodiment includes, as augmenting inputs 296, separately or in combination, signals such as speedometer output, a GPS navigational location and a time output, a radar gun output, and as many as eight digital (discrete) on/off inputs may be communicated to the system including a vehicle brake activation on/off flag, a siren in use on/off flag, and a chase light in use on/off flag. These augmenting inputs 296 are used to trigger initiation of the record mode (described above; e.g., signals 161) and/or to generate an overlay on the contemporaneously recorded video data (e.g., signals 144). For example, vehicle speed and location are provided as an overlay on the video from data supplied via the speedometer input and the GPS input respectively.

Under the process control of the video compressor card 103, the compressed data stored on the removable hard disk 118 are, in a general operation, read, decompressed, demultiplexed into video and audio streams, and generally with the digital video stream 230 being further decompressed, demultiplexed and conveyed to the plurality of video D/As 126 and generally with the audio video stream 231 being further decompressed, demultiplexed and D/A converted 231. The embodiment of the invention illustrated in FIG. 2 shows a system with first and second National Television Standards Committee/Phase Alternation Line (NTSC/PAL) monitor output in communication with the D/A converters 126 where the first is monitor 1 output 234 and the second is monitor 2 output 236. The video data are viewable and the audio data are audible in real-time or viewable and audible when replayed after a particular recorded incident has occurred. Various display devices such as a liquid crystal display (LCD) (not shown) are connectable to the monitor outputs so that the digital video data stored on the removable hard drive is viewable by the operator of the system or other persons. By including night vision light enhancing cameras as video capturing devices, the system is used to monitor in real-time events in low-light or no light (zero lux or zero lumens per square meter) conditions.

FIG. 2 illustrates four decompressed audio outputs 270 in general communication with the audio decompressor and D/A 231. One or more speakers may be connected to, or otherwise in receiving communication with, the system via the audio outputs in order to process and play the stored digital audio recordings in conjunction with the stored video. While retrieved video may be played-back onto traditional analog NTSC/PAL signal monitors, the video imagery may also be replayed on a general-purpose computer (not shown). In addition, the recorded video is suitable for enhancement using image filters (e.g., up to 36 different types of image filters). Moreover, by retaining the original recording and enhancing only a copy and/or utilizing a filter log to track enhancements, such enhancement can be performed without affecting court admissibility. Lastly, video clips may be associated with a report/incident writer.

Preferably, video authentication is used to ensure that any recorded video has not been modified. Such authentication preferably uses a mathematical formula in order to create a unique or nearly unique code for each frame (or sequence of frames) of video. The same formula is then applied prior to playback and the resulting codes must match for playback to proceed. Thus, in the preferred embodiments of the invention, during any video enhancement, if used, the original authenticated and recorded video and audio data is not tampered with or directly accessed. A copy of the recorded scene is transferred to the image enhancement tool software program on a PC, and various image enhancement filters are applied to the selected image. Therefore, no changes are made to the original recording. However, the image enhancement software preferably features its own log of what was performed on the original image, and the original and/or resulting "enhanced" images are stored in an authenticated format that cannot be altered once saved. Preferably, in no event are the original authenticated and recorded video/audio data from the vehicle either accessed or altered in any shape or form In the automobile embodiment illustrated in FIG. 2, a law enforcement data terminal 280 optionally is configurable to be in communication 282 with the system 200 at the video compressor card 103 via an adapter (not shown). The law enforcement data terminal 280 installed in a vehicle may or may not be radio linked to a central base station and may be used to access law enforcement data, e.g., data regarding a license plate number or a person's name or other identifying information, which are entered into the system by the officer or authorized operator. The system's NTSC or PAL signal protocol outputs preferably are connected 283 to this law enforcement data terminal 280, and exploit the data terminal's video overlay card to replace or complement the system's display, such as a LCD thin-film transistor (TFT) screen, overlaying onto the data terminal 280 the live or playback video of the system 200. In the event the law enforcement data terminal 280 is equipped and connected to a data transmission device with sufficient bandwidth and available network connectivity, the system 200 is capable of freezing its displayed video upon any desired still image and electronically requesting the law enforcement's data terminal to capture, compress, and transmit the still image from the vehicle to a central command center or any interested party having proper network access. Alternatively, software installed on terminal 280 may request video terminals and/or radio from system 200 and transmit such information to the central base station. Because video signals 234 from the system video recorder 210 are linkable directly to existing NTSC/PAL compatible input capture ports 282 as found in existing patrol car and other mobile computing solutions, generally the supply and installation of additional LCD monitors is not necessary, thereby minimizing the impact of additional required equipment on board already technologically loaded vehicles. This lessened burden of additional hardware is especially necessary when dealing with response vehicles smaller than a typical American police car, for example those used in Europe, or where there is concern of overloading a vehicle's electrical system. If the vehicle is not equipped with a computing system, the system invention preferably features a digital output for the transmission of either still or video streams to a central monitoring station by using an accessory interface coupled to a digital radio or cellular transceiver, allowing for both video transmission and remote video interrogation into the car.

In a system embodiment of the present invention, the system's control keyboard 290 is usable to control a selected zoom camera. The carrier vehicle may have other computing means and devices, such as a law enforcement data terminal 280, that can replace this zoom camera control function. In these particular cases, the installed zoom camera's RS-232 control connector is connected directly 292 to the RS-232 connection of the preexisting data terminal apparatus onboard the vehicle. The vehicle's data terminal computer 280 in one embodiment is loaded with camera control system software thereby allowing the operators use of the preexisting data terminal's touch screen to control the zoom features as well as the control of the iris and focus of the video cameras. This same preexisting data terminal, if using a Microsoft Windows™-based operating system, can replace the standard membrane control keypad and thereby be used to control the recorder via a RS-232 to RS-232 port connection between the police car's mobile data terminal 280, for example, and the system 200. Accordingly, when such data terminal 280 and RS-232 communication are used, and when the data terminal is equipped, or augmented, with an analog video signal capture card, no further components for this particular embodiment need be added to the system 200. All visualization of either live or previously recorded video and audio data is viewable or audible via the existing police car terminal 280 for example, as well as control all functions of the "human interface" with the recording system 200.

In the embodiment illustrated in FIG. 2, a control keyboard 290 is in communication with the video compressor and control board in the system 103. The control keyboard 290 includes play, stop, record, reverse, forward and pause buttons for performing the associated operations upon the stored video and audio. Accordingly, the police officer or other operator can replay stored digital video and audio data. This feature is particularly useful in any number of circumstances including the recording of fleeting information, such as a license plate of a pursued vehicle with a single touch of a button by an otherwise heavily task-loaded operator. By way of example and not limitation, during the recording process and to assist in the retrieval and video playback as well as subsequent logging of any scenes of interest, the recording system creates numbered, five-minute video clips, as well as creates incident or "clip" numbers corresponding to event activation if the recording system has been configured to the trigger-event, or pre- and/or post-event record modes.

The several embodiments of the present invention, including the automobile embodiment, preferably are self-diagnostic, i.e., self-monitoring of the functionality of the system, thereby ensuring that a recording with the requisite fidelity is being achieved. Whether through the system LCD monitor or using one of the system's relay outputs triggering a record light, or through trouble messages being displayed and status messages displayed on an existing in-car data terminal, the recording is verified by the hard disk drive writer (e.g., by reading back the recorded signals and comparing them with a correspondingly cached signal.

In one embodiment, the system uses a simple English language text overlay on the output of the monitor 1 output display 234 to provide status of the recorder as to low temperature and operating the pre-heat function of the solid state thermo cooler 294 and thus warning of a potential failure of the recorder to meet the hard drive's operating temperature limit, and also to provide verified recording. This same display indicates the time (in the hour:minute::second format, for example), date, vehicle number, badge or user/driver number, description of the camera being viewed and other status information (i.e., information pertaining to the recording, environmental conditions during the recording, the states in which various components are operating during the recording and other events and notifications during recording).

It is noted that instead of overlaying such text and information on the input video signal, such status data can instead be recorded on storage device 118 in digital format and in synchronization with the video data so that, upon playback, a user can choose what, if any, such data to display. Such synchronization can be accomplished, for example, by simply including the relevant information in a header associated with each video frame, or every couple of frames, depending upon how frequently updates are required.

All connections to the system inputs at the housing are connectorized and feature internal built-in electronic circuit protection for every power line connection to these as well as other ancillary devices. Connections to all ancillary devices such as cameras, monitors, and keyboards are tamper-resistant. Preferably, there are no plugs or connectors on these ancillary devices that facilitate unintentionally or inadvertently disconnecting. Alternative embodiments include wireless communications.

A serial port 239 and an ISDN/PSTN TCP/IP port 237 are provided. These ports support embodiments where, in addition to or in place of hard disk removal, the compressed data is retrieved by an external computing system via a wired or wireless network, e.g., via LAN topologies and/or WAN topologies (including the Internet).

The system may be used to record both video and audio in applications where incident-only recording is needed. In the preferred embodiment, eight trigger signal (or alarm) inputs 296 are available for recording purposes should a trigger signal, such as a chase light activation, air bag deployment signal or the like, occur, typically for up to five minutes prior to the event, anytime during the event, and typically for up to 30 minutes after the event. These pre- and post-event times are adjustable as desired during installation via the system keyboard 290 by accessing the system's programming/set-up menus. In addition, if monitor 2 output 236 is used, video pertaining to these trigger signals (e.g., the pre-event video) can be displayed independently of the camera scenes viewed on monitor 1 (not shown). Preferably, the video provided to each monitor output may be user-selected from any live video camera feed, from any portion of the video data stored in storage device 118, from any portion of the video data stored in buffer 180 or may be generated user interface (including text and/or graphics), e.g., for finding stored video segments of interest, for altering system settings, or for controlling video recorder or camera functionality.

The stopping and starting of recording is set, in one embodiment, to one of the following modes: (1) ignition-based recording (i.e., if ignition on, then start, if ignition off, then stop); (2) event-only recording (e.g., on while chase lights on, on while siren on, or while manually triggered recording); and (3) event recording with pre-event and post-event recording (i.e., recording for a programmed duration before and a programmed duration after an event as well as during an event, where events include chase light, siren on, airbag deployment trigger, manual triggered recording, and the like).

In the carrier vehicle embodiments of the present invention, the playback of video is effected in the vehicle using the system keyboard 290 and monitor, with password access if so required. Optionally, playback is effected in a car via laptop or other computer 280 using serial/or TCP/IP or serial connection. Generally for the several embodiments, playback may be done on a separate PC-based playback/operator review station and by removing the hard drive (removable driver/data shuttle) or the recorder and inserting it into an appropriate PC using proprietary play-back software or similarly by removing the hard drive from the recorder and inserting it into another mobile recorder. Preferably, the system is configured so as not to include any operator controls to permit erasing of previously recorded video or audio; as a result, recorded video in the vehicle may not be accidentally or intentionally erased by the operator.

When the vehicle ignition is turned off, the system continues to record (either to the buffer in buffering mode or to long-term storage in the recording mode) for a predetermined period of time, e.g., a period of time preset via the DIP switch 205 settings of the microprocessor board. If the ignition is turned back on before the system times out, the shutdown timer is reset. The system is capable of running without the connection of any control keyboard or system NTSC/PAL monitor. Existing vehicles' law enforcement data terminals are generally connectible to the recorder 202, controlling the entire recording system as well as its set up, and provides a viewing of both live and previously recorded video and audio, thereby maximizing space capacity in a vehicle. Use of available membrane control keypad and LCD/system monitors are not required if a Data Terminal 280 using a Windows-based operating system and an RS-232 serial port 292 are available.

For the carrier vehicle embodiments of present invention, power supply 260 of the system provides regulated 12 Volts DC 261 to power the cameras that are in communication with the processing and recording means. Power is applied to the cameras when the system has been powered, and power levels remain constant while the system is in the record mode, with the device shutting down power to the cameras when the ignition sense line and associated timer has sent a stop signal. In this way, one avoids the unnecessary draining of a vehicle's battery by constantly running and powering cameras when the system is not otherwise being used. This procedure also ensures that no human intervention is required to turn on and off cameras. This same line may also power the on-board LCD monitors in a similar fashion. Electronic, self-resetting fuses protect all power inputs and outputs. The power supply 260 of system 200 preferably accommodates a wide voltage input range (e.g., 10.5 to 38 volts DC), as such a wide range may be presented by certain vehicle voltage supplies. The system preferably is entirely filterless and ventless, and has been designed to operate in any mobile, enclosed or open, DC-powered environment.

The system may also be connected to the vehicles' airbag deployment output sensor, and when utilizing the pre- and post-event record mode, automatically capture video and/or audio as well as vehicle's status if connected to do so, storing vital information of what happened prior to an accident.

The mobile digital audio and video recording system embodiment of the present embodiment provides high-quality digital video recording with audio with a full real-time 30 frame-per-second (fps) refresh rate that does not by its nature degrade due to use or duplication or shelf life. One embodiment provides for recordation of four video channels and two audio channels while another provides for recordation of eight video channels and four audio channels. Moreover, the digital video recordings provided by the system do not generally degrade over time as recordings are made to hard disk and due to the method of video authentication during the digitization and compression of the video signal, the video is also authenticated for court admissibility purposes.

The cabinet or housing 202 of the preferred embodiment of the present invention is smaller than either PC or VCR-based systems and accordingly may be installed in most compartments of the carrier vehicle. In addition, where the carrier vehicle is a motorcycle, the housing of the preferred motorcycle embodiment may be mounted in a sealed radio compartment saddle or other carrier means of the motorcycle. Aside from sensor and power feeds, the system operates in a generally self-contained, sealed housing that, in a preferred embodiment, includes a heating and/or cooling system allowing the system to operate over a wide range of temperatures without the use of any openings into the cabinet.

Figure 3:
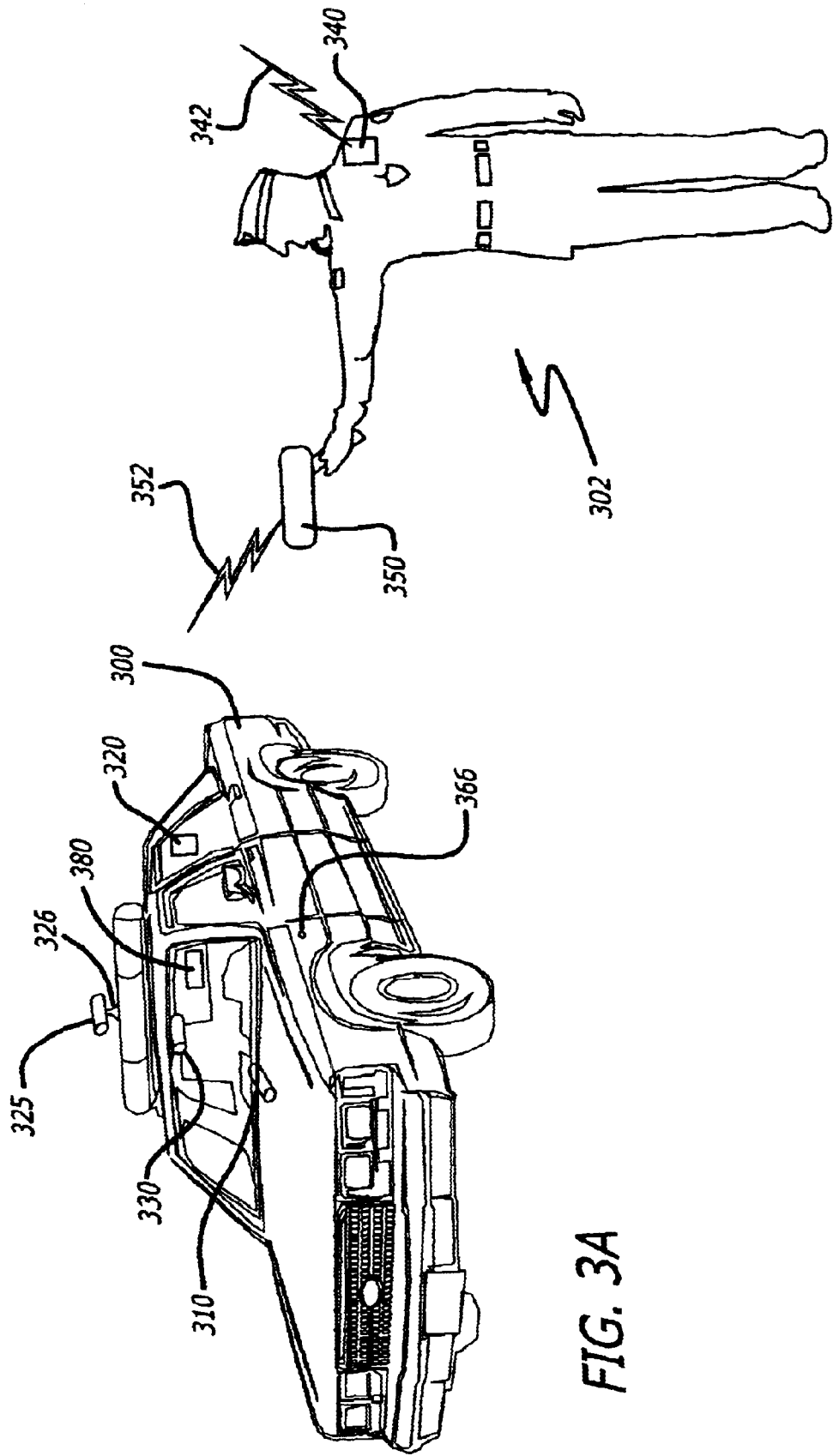
FIG. 3A illustrates several camera and microphone locations of a mobile digital video and audio recording device according to an automobile embodiment of the invention.
FIG. 3B illustrates camera and microphone locations on a user of a mobile digital video and audio recording device according to an automobile embodiment of the invention.

Video and audio signals are supplied to the video and audio channels from remote video and audio capture devices, such as a video camera and a microphone, that in ground vehicle (as carrier vehicle) embodiments are typically mounted to the carrier vehicle and oriented to maximize the useable view of the surroundings of the vehicle. FIG. 3A illustrates that in one embodiment, a first video camera 310 is mounted to record events through the front windshield of a patrol car 300 and a second video camera 320 is mounted to record events in the rear seat area of the patrol car where arrested parties may be.

As described above, a roof-mounted video camera 325 also is provided. Camera 325 has a motor in its base 326 for rotating camera 325 in response to signals provided from system 101 (e.g., to locate a wireless microphone or other transmitter). To facilitate such locating, base 326 also includes multiple directional receiving antennas around its circumference.

An additional camera may be oriented so as to view events out the rear window or from any other desired angle. In one embodiment for patrol cars, an audio microphone 330 provides audio data from within the vehicle to record radio traffic as well as the conversations internal to the vehicle. A second microphone 340 is carried by the patrolman 302 in FIG. 3B to receive, transmit 342, and record any conversations that the officer has outside a vehicle. Optionally, a wireless camera 350 is patently or covertly mounted on the officer or carried as a hand-held unit designed to document a crime scene. The wireless unit transmits two or more real-time video signals 352 back to system 200 located in the patrol car. Additional video cameras (e.g., 380) and microphones (e.g., 320) are mounted to receive video and audio signals from all sides of a patrol car or an emergency vehicle. Still further, a direct audio cable connection between the patrol car's two-way radio and system 200 permits radio conversations to be recorded by system 200 without unnecessary interference.

In the preferred embodiment of the invention, an auxiliary dotter board is included in addition to the recording control, compression, multiplexor and synchronization device 116, and a specific camera video signal is directed to this controller. This camera is oriented so as to maximize the likelihood that it will capture vehicle license plates as the patrol car or other carrier vehicle is driven (e.g., angled downwardly and to the right of the motion of the vehicle if mounted on the dashboard and checking license plates of parked cars). As a result, the recording system 101 or 200 captures in real time and analyzes through an OCR (optical character recognition) firmware application, vehicle license plates observed while the patrol car is in motion. Various image processing software packages are available for processing motion video, extracting textual information in the video and recognition processing such textual information to obtain ASCII or other textual data from the images. However, the software provided by Asia Vision Technology Ltd., adapted for use with the real-time operating system of the present invention, currently is preferred. As each license plate is read in this manner, the number is matched to a database that is internal to system 101 or 200. Such internal database stores license plate information regarding any persons that are being sought and/or monitored by law enforcement and may be kept current by implementing the database on a removable memory module that is periodically updated, or by periodically updating the database over a local area network (LAN) or other connection to a central database. In the event a match is found, the officer is alerted, e.g., via computer 146, a separate monitor and/or an audible alarm. In addition, or instead, information regarding a particular matching license plate (e.g., the GPS location of the corresponding vehicle) may be added to the database and/or transmitted to a central base station via a wireless link, where the database entry indicates that the individual is to be tracked.

Data Uploads; Long-Term Storage

In an embodiment of the invention, the compressed information on the high-capacity storage medium is transferable via a wireless connection (e.g., a wireless intranet) to a database of a central base station. In this embodiment, when the carrier vehicle is within transmission range of its wireless communication device to either the base station or a wireless access point, the base station or the user through the onboard computer 280 or other input device 142, initiates a data upload from the high-capacity data storage medium to the central database. Alternatively, the transfer is set to begin automatically when system 101 detects the presence of the wireless connection.

This embodiment is configurable with spread-spectrum communication using frequency-hopping spread spectrum, direct-sequence spread spectrum, and time-hopped spread spectrum. Furthermore, it is configurable with a custom wireless network file transfer protocol, i.e., transmission of packets of voice and data, or commercially available wireless network packet transmission protocols according to IEEE Standard 802.11. Additional wireless implementations include other secured radio frequencies.

As a still further alternative, the transfer may be performed via a hard-wired connection. For example, in an alternate embodiment of the invention, a separate data port (e.g., port 366 shown in FIG. 3A) is provided on the vehicle 300 (e.g., mounted to an automobile fender, so as to be accessible from outside of the automobile) and is hard-wired to system 101. Upon processor 116 detecting the appropriate network signals (meaning that an appropriate system has connected to the data port), processor 116 automatically initiates the data transfer procedure. By monitoring port 366, system 101 can cause data uploads to occur automatically when an external network or storage device is plugged into port 366. Thus, recorded video and audio that are stored in the system data storage device are, in one embodiment, transferred via a serial or Ethernet connection to a PC, or other digital processing apparatus, equipped with compatible system software or remotely via connection to a general-purpose computer using integrated services digital network (IDSN) communication lines. In such a hard-wired embodiment, it may also be preferable to provide power to system 101 through the data port, thereby preventing depletion of the vehicle's battery.

Alternatively, recorded video from the system is uploaded to an external PC or hard drive array that is external from the carrier vehicle by connecting the system's removable hard disk with the external PC. In either any of the foregoing embodiments, upon confirmed data transfer the data on the high-capacity data storage medium 118 becomes erasable or overwritable. The system can be implemented with off-the-shelf technology for wired or wireless connectivity for either remote video transmittal or wireless upload to a centralized database collector (e.g., a server).

It should be noted that the foregoing techniques are in addition to simply removing the storage medium 118 and (e.g., removable hard disk, recordable DVD or other medium) transferring the contents thereof to a central storage system.

Motorcycle Embodiment

In a modified embodiment, the system recorder 101 is configured so as not to require any (or any significant) human intervention, including input via use of keypads or system monitors. This embodiment of the system is capable of satisfying unserved needs both in terms of reduced size and increased flexibility for DC mobile applications such as motorcycles, intermodal transports and the like. To keep the center of gravity low, and thereby to maintain stability of a motorcycle on which system 101 is to be used, the sealed enclosure of the device preferably is made out of aluminum, Kevlar, fiberglass or any other robust, light-weight material. The latter materials, particularly non-metallic materials, preferably are coated with an RFI/EMI shielding paint to meet Federal Communications Commission (FCC) and other system and emissions requirements.

Figure 4:
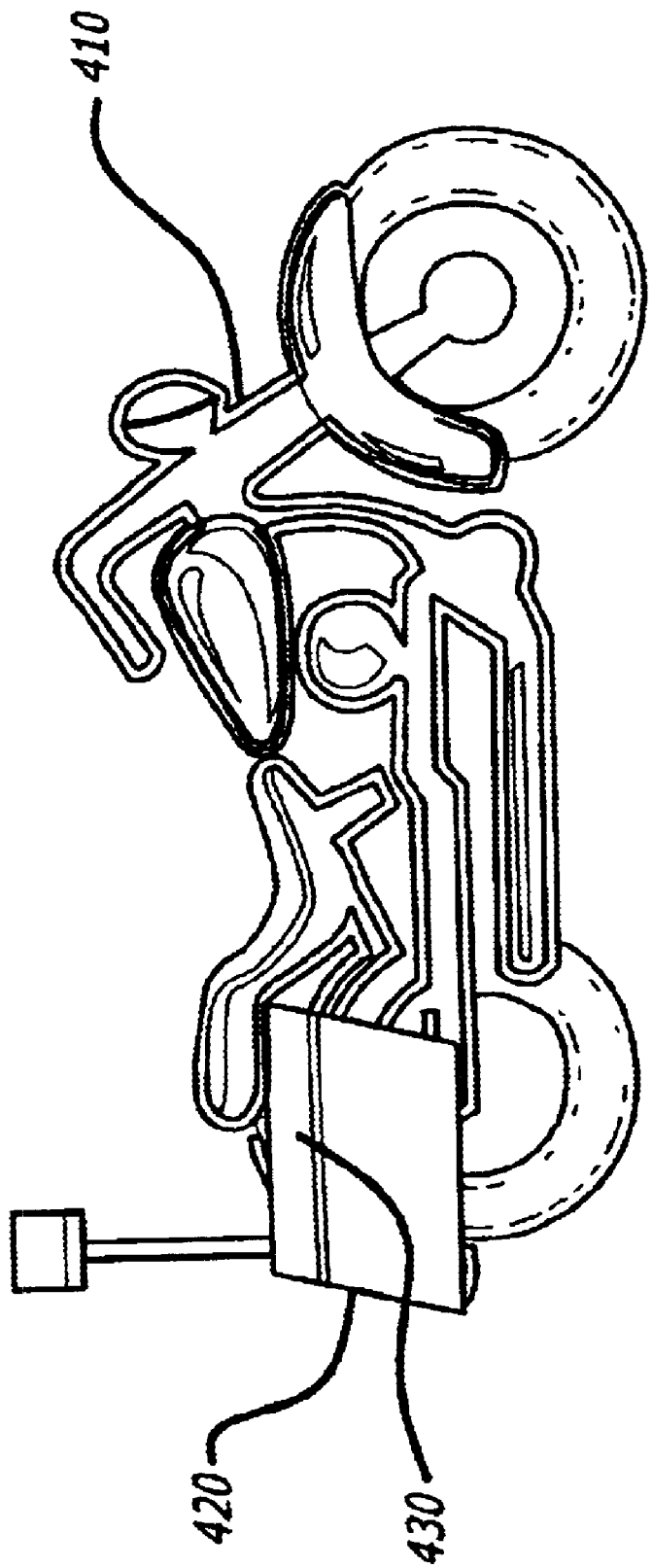
FIG. 4 illustrates several camera and microphone locations of a mobile digital video and audio recording device according to a motorcycle embodiment of the invention.

In the embodiment shown in FIG. 4, two cameras are installed on-board a police motorcycle, one looking forward 410, the other looking backwards 420 towards on-coming traffic. The system 430 is mounted in the radio compartment of the motorcycle and records both video and audio (e.g., from a wireless microphone) onto the system hard disk. Otherwise, system 430 may include any or all of the features described above in connection with FIGS. 1A, 1B and 2. Any or all of: data from a radar gun, speed of the motorcycle when moving, and/or any other parameters of the motorcycle (or patrol car or other vehicle), such as status of the vehicle's brakes, turn signals, chase light, siren, speed, and the like, may be recorded along with the video in digital format, overlaid on the video and/or used to trigger initiation of the recording mode, all as described above. As there are two other camera inputs available, portable wireless cameras may be coupled to the system for scene and accident investigations, or for documenting a more advanced traffic stop with wireless cameras mounted on portable tripods.

Mass Transit Monitoring

A video recording system 101 according to the present invention also may be advantageously utilized for monitoring events within a vehicle, such as an airplane, bus, train or other mass transit vehicle. The following description generally will assume that the vehicle is an airplane; however, the system 101 may be used with any other vehicle.

Generally speaking, this embodiment of the invention contemplates two separate modes of operation. In continuous recording mode, system 101 or 200 continuously records video and audio on a closed-loop basis using all available storage capacity (i.e., all capacity not required for other purposes), overwriting previously recorded data on a first-in-first-out basis. Where multiple cameras or other video/audio input devices are used, continuous recording preferably uses true frame multiplexing, recording one frame from each camera in a continuous sequence. In the event-based recording mode, video and audio is only recorded upon the occurrence of a triggering event, as indicated by receipt of a trigger signal; in most embodiments, this mode also will include the pre-event recording feature described above. The mode to be used can be pre-configured, settable by the user, or settable based on detected conditions (e.g., continuous mode recording while the airplane is parked or otherwise on the ground and event-based recording while in flight).

In a representative embodiment, the system 101 is configured to operate, under normal circumstances, in a continuous-recording, low-frame-rate (e.g., 1 or 2 fps) mode, with higher frame-rate recording (e.g., 30 fps) into buffer 180. Then, upon the detection of a trigger signal 161, the contents of buffer 180 are preserved for long-term storage and system 101 also begins recording at the higher frame rate in real-time. Upon return of the trigger signal to its normal state and any specified post-event recording (as described herein), system 101 would then return to the initial mode of continuous-recording, low-frame-rate long-term recording, with higher frame-rate recording into buffer 180.

Referring to FIG. 2, wireless or hard-wired emergency pushbutton switches 296 are usable to signal an audible, visual or other alarm within, for example, the cockpit of an airplane, as well as to trigger a switch of the system 200 into the recording mode. The same alarm signal may trigger transmission of the video (e.g., from covert/unobtrusive cameras 102) off the vehicle (e.g., airplane) to a ground station, etc., via a Global System for Mobile Communications (GSM), Code Division Multiple Access (CDMA) or any other available wireless connection 233 (e.g., in connection with a TCP/IP or PSTN network). Preferably, system 200 provides for live video scene switching from any camera 102 onto any monitor connected to the monitor 2 output 236, as well as use of the remote video transmission option. The input capacity preferably includes at least eight analog video signals and four analog audio signals.

The wireless panic transmitters or hard-wired panic pushbuttons 296 located throughout the plane may be connected directly with the video compressor card 103 or the microprocessor-based control board 204, depending on the configuration of the system 200. If the recorder 200 is not set up to continuously record, the video and audio recording begins immediately upon an alarm trigger, with the pre-alarm function enabled in most configurations to also record some events before the alarm trigger (as described above).

Because in certain embodiments the system can play back previously recorded video on one monitor while viewing live video on another, a monitor connected to monitor 2 output can automatically alert the crew to the nearest camera area, while the monitor connected to the monitor 1 output is used to play back scenes that are related to the cause of the trigger signal (or alarm). Any system user may call up specific camera views from specific cameras onto one or more NTSC/PAL monitors installed on-board the plane. In one embodiment, the trigger signal inputs are programmed to drive output relays connected with other devices such as wireless video transmission channels to transmit live video and audio of pre- and post-events to a remote central monitoring station, such as an air traffic control tower.

In this embodiment, a miniature TFT LCD monitor is located along with a control keyboard in the cockpit of an airplane allowing for live view and camera selection by authorized personnel of either the selected view or of all installed cameras. A secondary monitor is installable in a secure, separate location, accessible only by authorized personnel, to provide viewing in cases of duress. In case of such duress, either signaled by the flight attendants or flight crew by way of a combination of wireless panic transmitters, or hardwired panic buttons distributed within the cabin and cockpit of the plane, an alarm signal may be transmitted both to the cockpit, with live video and audio transmission being forwarded to a remote location, or a plane may be independently contacted by a ground control station (either directly or via a satellite link) or by responding mobile forces, thereby allowing the viewing of activities within the airplane in real time both off-board and within the cockpit.

Four miniature, unobtrusive cameras, preferably color, and two audio microphones are installed on-board and connected to a video distribution amplifier which then sends the signals both to the digital recording system 101 and to an MPEG 4 transmitter, or any other type of digital compression transmitter, which when coupled with a trigger signal may store pre- and post-trigger signal video scenes until communication is established with a ground or other receiving station. Conversely, a ground or other station may initiate contact with the airplane to view camera video (either live or stored). One or more cameras may be installed in the cargo hold to provide information as to status of cargo, particularly live cargo (e.g., pets). The recording system 101 preferably records video from all cameras, with 2 audio channels, for 24–30 hours onto a removable 75 Gigabyte hard drive in a loop fashion without any human intervention. Moreover, the system can be configured to record 24 hours per day, (e.g., continuous mode) or utilize the recorder's built-in video motion detection system recording only intrusions into the field of view of the camera, thereby allowing for ease of retrieval and quick analysis of the plane's security and permitting, for example, a pre-flight inspection of any and all activities while the airplane was parked at the gate or in any ground area.

In a somewhat modified embodiment, up to four cameras are connected to a MPEG 4 TCP/IP, phone line or other router/interface. The signals are then communicated by bi-directional wireless communication via satellites, ground stations or responding forces (not shown). The system receives its primary recording commands from the avionics and it is through the avionics that an optional TFT LCD and an optional control keyboard are connected.

Other embodiments of the invention are applicable for in-vehicle monitoring, such as in buses and in mass transit-light rail or commuter trains. The panic trigger signal (or alarm) inputs described in the airline portion above can be connected to intercom points, emergency stop buttons and the like, and thereby allow the engineer or conductor to see in real time any signaled event on one monitor as well as view the playback of that which occurred before the event on a separate monitor.

Mobile Scene "Photography"

To aid the scene investigations of accidents, hazardous materials spills, and the like, an embodiment of the present invention is used to replace unauthenticated JPEG still digital video cameras, allowing the device to act as a remote authenticated digital video storage device. To accomplish this, a wireless video transmitter is connected to a portable DC camera. Whether connected with or without a small LCD monitor, this embodiment links a wireless camera with optional audio to transmit video and/or audio signals up to 800 feet or more back to the housing installed in a vehicle or base station. Recorded live video scenes may be played back, and authenticated video stills may be then reproduced for distribution, whether in the field or at a main data collection station. To ensure that the video and/or audio data has been successfully received at the recorder location, the received video/audio data (or a hash thereof) may be sent back to the remote transmission device.

Traffic Monitor

Another embodiment of the present invention is for use in capturing identifying information regarding vehicles involved in traffic violations. In this embodiment of the invention, the input signals 144 and 161 may include Doppler laser or radar indications of the speed of a vehicle, or speed sensor signals from other devices, such as an in-ground loop or pair of self-powered wirelessly linked sensors for determining vehicle speed based on the time required for the vehicle's tires to travel from the first sensor point to the second sensor point embedded in the road, or video-based speed detection systems, such as provided by Peek and Odetics. In addition, input signals 144 and 161 may include other signals, such as laser range finder inputs indicating the distance to a vehicle, traffic signal inputs showing the state of a traffic signal, real-time clock inputs for showing the time of day and similar inputs. The trigger signals for initiating the recording mode may be detection of a vehicular speed above a specified threshold (e.g., speeding), detection of a minimum vehicle speed above a specified threshold (e.g., failure to stop at an intersection having a stop sign), or detection of vehicular motion in an intersection while a traffic signal is in a particular state (e.g., red light violations), or during some specified period (e.g., 2 seconds) after the traffic signal has changed to that state (e.g., running a red light).

A system 101 according to this embodiment of the invention may be stanchion-mounted on either a stationary platforms or, in certain embodiments, using servos. The pre-event capture capability of the system together with its authentication and post-recording video filtering capabilities allow for multiple views of a target vehicle as the moving target violates traffic laws. Moreover, use of multiple cameras (e.g., one focused on the area where the license plate is likely to be located and one providing an overview of the scene) often can both document the infraction and provide additional certainty regarding the identification of the vehicle.

In certain embodiments, the stored imagery can be downloaded remotely, e.g., via an integrated services digital network (ISDN), a wide-area network (WAN) and Internet connection, or a wireless connection. In addition, or instead, such data may be transferred to another device by removing the removable storage medium 118 and directly transferring such data to such other device. The pre-event capture, as well as the data overlay of the speed measured and other parameters, fully authenticates the incident. Accordingly, the vehicle engaged in the infraction can be better identified.

Operational Control

Figure 5:
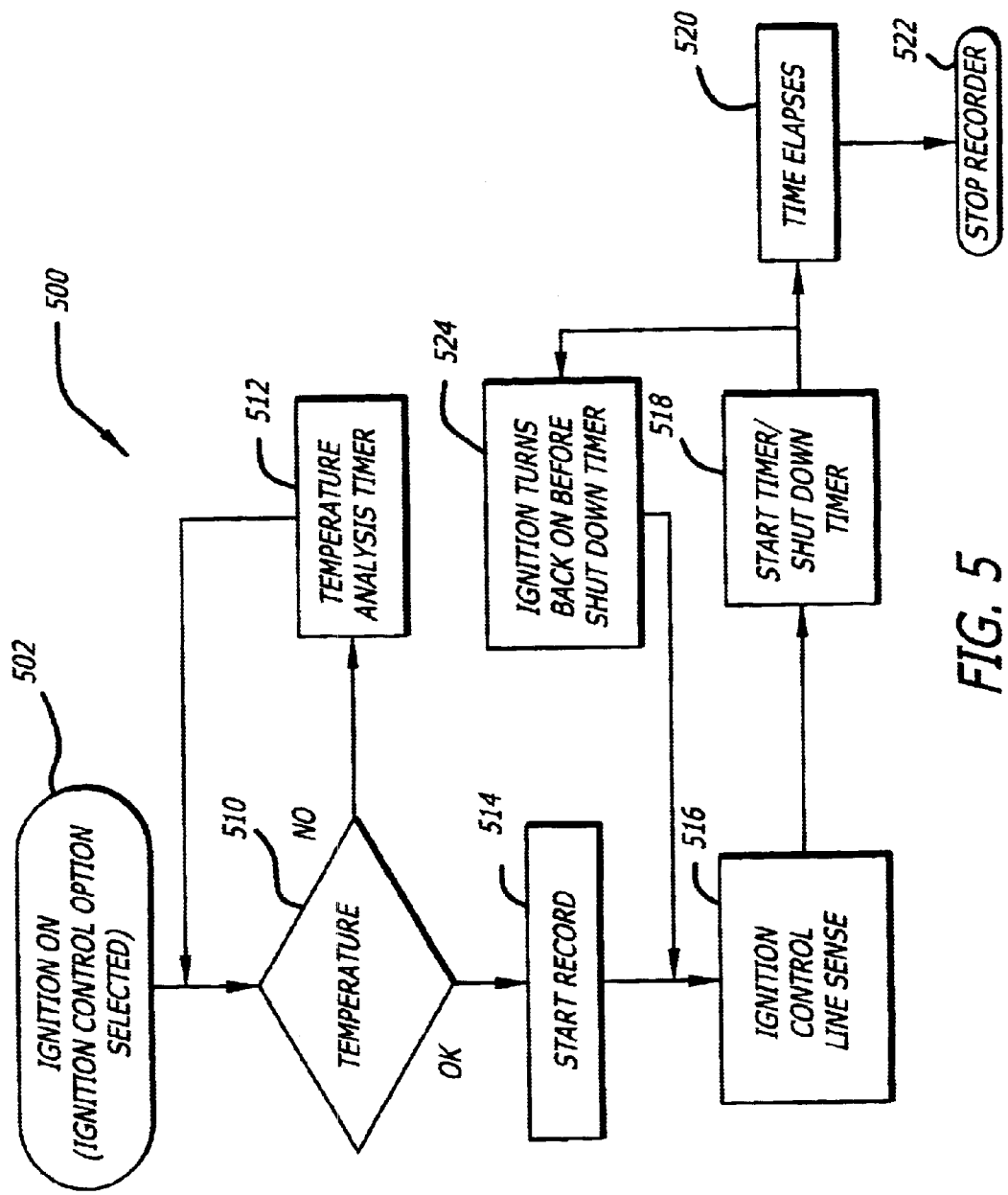
FIG. 5 is a flowchart illustrating a method for controlling digital video and audio recording in response to vehicle ignition line signals.

A system according to the present invention preferably can record at up to 30 fps continuously from ignition (engine start) and may be programmed to continue to record after the ignition has been turned off. FIG. 5 illustrates a video recorder temperature-based operation control and post-recording process 500 that may be used in a representative embodiment of the invention. Process 500 may be executed by processor 116, controller 130, any combination of the two, or any other combination of hardware, software and firmware.

As shown in FIG. 5, once the ignition is on 502, the recording may be started 514 or a temperature analysis timer may be started 512, depending on the temperature test 510. Preferably, test 510 determines whether the temperature of the system is within a desired operating range (e.g., from 30° F. to 125° F.). If the temperature test 510 is failed, timer 512 causes it to be repeated after a specified period of time. Once the temperature test 510 is passed, the recording (to buffer 80 only, pending a trigger signal) is started 514. Temperature analysis threshold points may be modified as needed to suit varying applications by making changes in the removable EPROM (erasable programmable read-only memory) located on board 204. During recording, the ignition control line is monitored 516 until the ignition is turned off. Thereafter, start timer/shutdown timer 518 is initiated to produce the desired time lapse 520 prior to recording cessation 522. When the ignition is turned to off, and depending on settings (e.g., the DIP switch settings) and system capacity, the recorder will record for additional time such as for 60 seconds to 60 minutes, depending upon the specific embodiment. Should the ignition be turned back on during this period, the timer would be reset 524. This feature is useful to record the area surrounding the patrol car if the officer turns the patrol car off when he arrives at the scene, or a mass transit bus has stopped momentarily at its terminus location. The microprocessor includes a set of DIP-switch inputs that are used to configure recording stop and system shut-down times when the ignition sense line signal is removed, and all other system programming such as recording start settings (e.g., upon vehicle ignition, upon alarm trigger, and other operational states). This programming also may be done via a heads-up display when the device is in a "programming and set-up mode".

Buffering and Continuous-Loop Recording

Figure 6A:
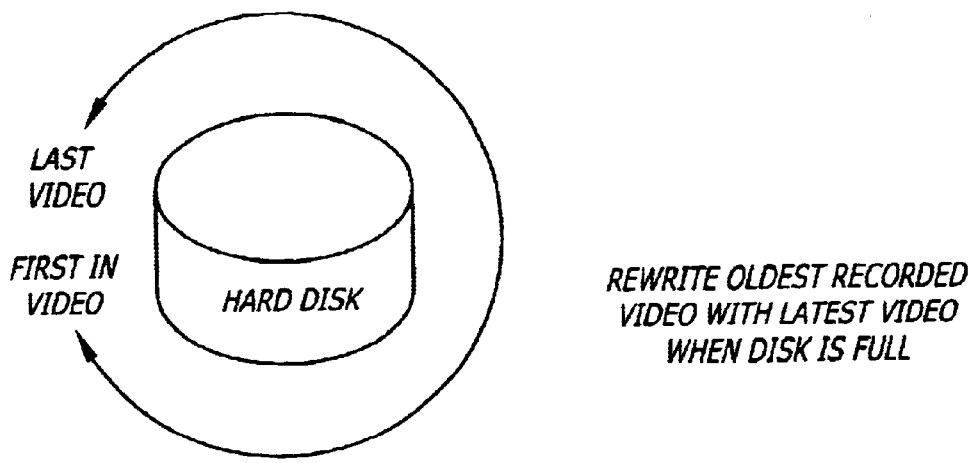
FIG. 6A is a diagram illustrating loop recording in the hard disk.

In certain embodiments of the invention, continuous-loop recording is performed, either for purposes of buffering video and audio in order to provide pre-event recording (e.g., to buffer 180) or for purposes of continuously maintaining a record over a rolling time interval (e.g., to long-term storage device 118). As shown in FIG. 6A, which assumes that the storage device is a hard disk, such recording is performed on a first-in-first-out basis, in which newly recorded data overwrite the oldest data in the buffer (or loop). Alternatively, it is possible to merely to record until the storage device is full and then cease recording without causing any overwriting.

Figure 6B:
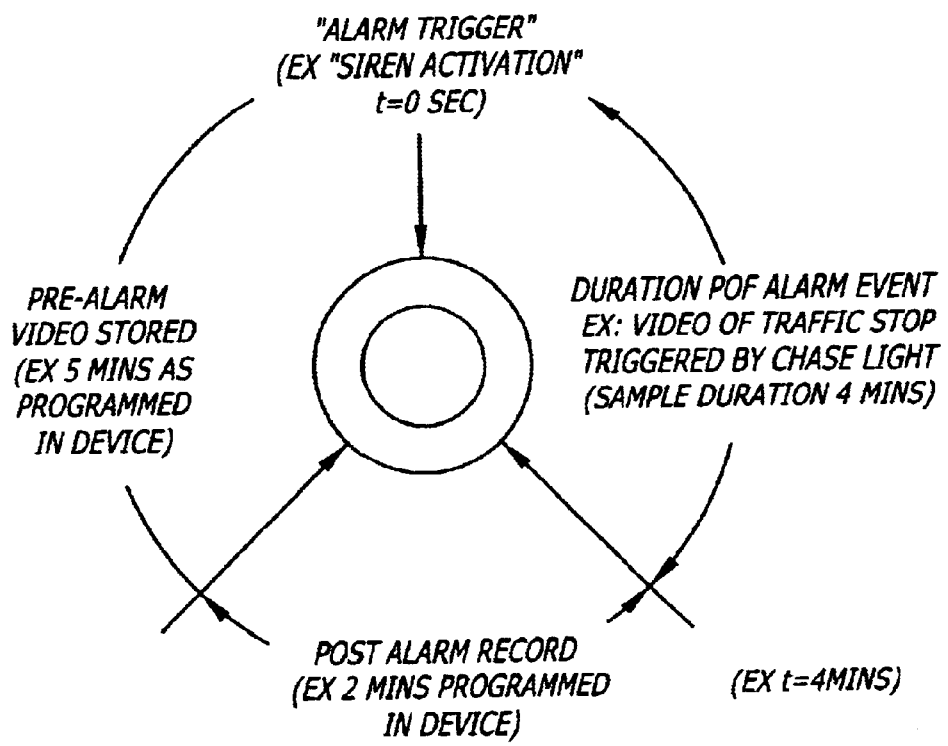
FIG. 6B is a diagram illustrating a ring buffer.

FIG. 6B illustrates the effects of the buffering mode as well as post-event recording according to the present invention. In the buffering mode, a buffer 180 is used to temporarily store the video and audio data on a rolling time interval basis before the recording mode is initiated. Buffer 180 can be located either in a high-speed buffer memory or in the hard disk. Upon the occurrence of a trigger event, the contents of buffer 180 (e.g., 5 minutes of recording) are preserved for long-term storage and real-time recording to long-term storage in device 118 begins. Once the trigger event is discontinued (e.g., the chase lights are turned off), the system's firmware causes the recording to long-term storage in device 118 to continue for a specified period of time (e.g., 2 additional minutes).

Device Heating/Cooling

In preferred embodiments of the invention, system 101 monitors and regulates its own temperature. In one example of the automobile embodiment, the system 101 has an operating temperature range of between 15° F. and 173° F. ambient. However, system 101 preferably attempts to keep the temperature within a narrower operating range. Thus, system 101 preferably includes a shutoff circuit that, on an ongoing basis, monitors internal temperature and deactivates any buffer storage or recording (or at least any such storage or recording that is affected by temperature) when the temperature of system 101 is not within a range of approximately 30° F. to 125° F.

The heating/cooling system preferably includes a reversible heating system utilizing thermo-electric technology. An internal thermostatic control causes heat to transfer in or heat out, depending on the application, using a heat sink rather than by direct air being forced in or out of the system, as is commonly done with VCR or PC-based systems. The settings of these thresholds and operational points are modifiable as needed to cover other applications that require the use of a DC-powered and mobile/transportable recording device. Use of such a solid state heat pump largely eliminates the drawbacks of conventional heating and cooling systems that include openings and filters, and in so doing provides a recording platform largely free of airborne contaminants and associated maintenance. Accordingly, various components of the system are environmentally sealed in a box (housing).

Figure 7:
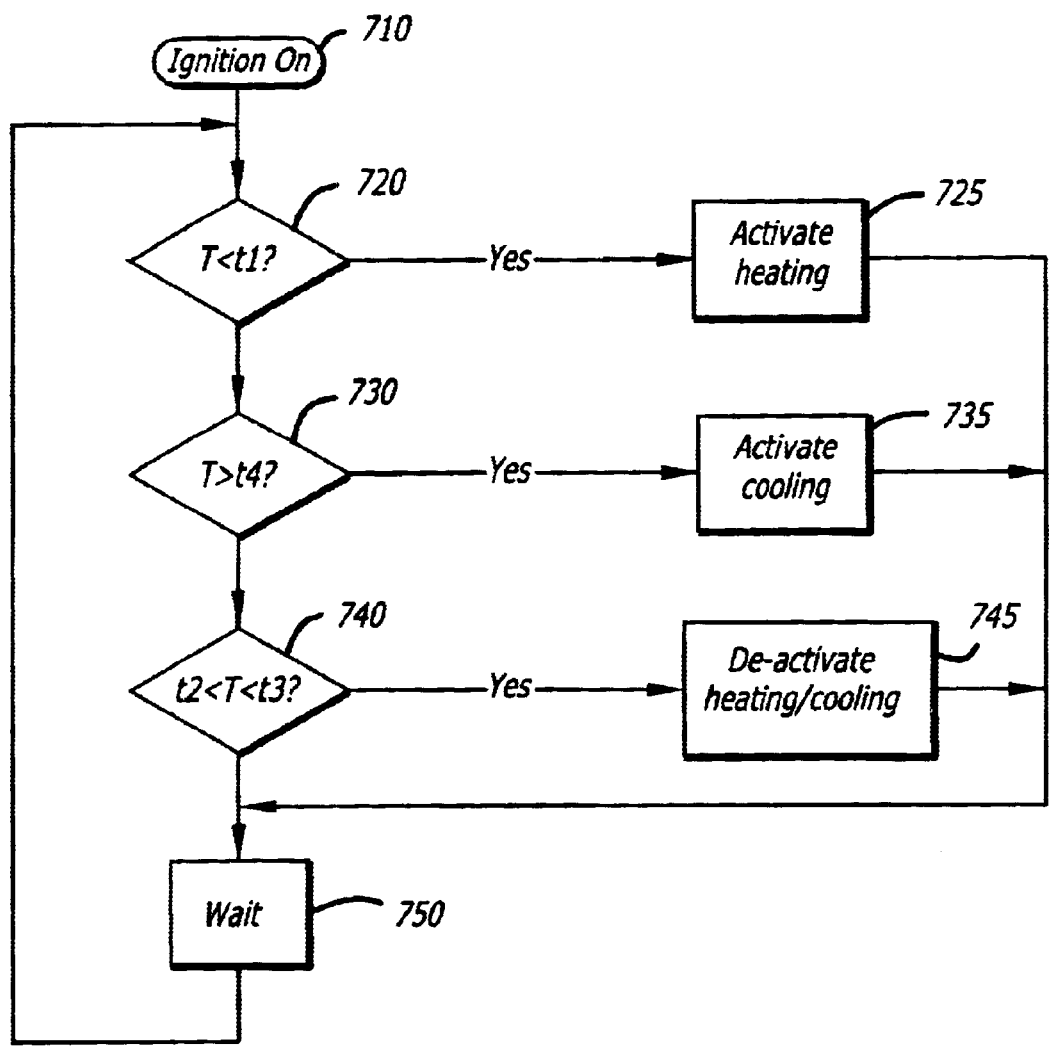
FIG. 7 is a flowchart illustrating a method for temperature management according to a representative embodiment of the present invention.

FIG. 7 illustrates one technique for controlling the temperature of system 101 according to the present invention. Upon the ignition of the vehicle 710, temperature monitoring and control begins. The microprocessor provides thermal management for the housing and its contents using temperature signals from a temperature sensor (such as sensor 207 described above), and by controlling a solid-state thermoelectric cooler/heater in response to the temperature signals. Preferably, the heating/cooling device is a Peltier element or other solid-state heat pump that is disposed on the video recorder cabinet 207, with one side of the element being disposed with the cabinet 207 and the other on the outside of the cabinet 207, with the outside portion attached to cooling fins and with a cooling fan mounted on the cabinet so as to force air through the cooling fins. It is also preferable to include a separate fan inside of cabinet 207 in order to facilitate air circulation. Heating is accomplished by applying a DC voltage to the Peltier element and cooling is accomplished by a DC voltage of the opposite polarity.

Referring to FIG. 7, a method for thermally managing the housing environment is illustrated. FIG. 7 illustrates a process for system temperature control when the vehicle ignition is turned on. Based on receiving the ignition sense 710, the temperature analysis within the microprocessor tests to determine 720 whether the sensed internal housing temperature is below a threshold t1 (e.g., 30° F. or 35° F.). If so, then in step 725 the microprocessor sends a heat control signal to the thermoelectric cooler/heater to activate heating (if not already on), and processing proceeds to step 750.

Otherwise, processing proceeds to step 730 to determine whether the sensed internal housing temperature is above t4 (e.g., 85° F.). If so, then in step 735 the microprocessor sends a control signal to the thermo-electric cooler/heater to activate cooling (if not already on), and processing proceeds to step 750.

Otherwise, processing proceeds to step 740 to determine if the sensed internal housing temperature is between t2 and t3 (e.g., 40° F. to 75° F.). If so, then in step 745 the microprocessor sends a control signal to de-activate any heating or cooling that is on, and processing proceeds to step 750. Otherwise, processing proceeds directly to step 750.

It is noted that the temperatures at which heating switches on and off and the temperatures at which cooling switches on and off preferably are different (e.g., by a margin of 5° F. to 10° F.), which often is desirable to prevent unwanted temperature cycling. A delay occurs 750 and then the process is repeated. Preferably, the temperature is re-checked and any necessary changes effected every two minutes (i.e., step 750 waits for 2 minutes).

Thus, in one embodiment the system initially is started with vehicle ignition and the initial temperature check as illustrated in FIG. 5. Thereafter, the system 101 or 200 can be shut down as shown in FIG. 5. However, while system 101 or 200 is operating the temperature regulation process shown in FIG. 7 is performed. If at any time an out-of-operating-range temperature is detected, then recording is stopped until the process shown in FIG. 7 restores system 101 or 200 to an in-range temperature.

The above-described technique for temperature management can be further improved in alternate embodiments of the invention. For instance, in the above technique the heating/cooling element is always on or always off until a specified threshold is reached. However, in alternate embodiments of the invention between certain thresholds the heating/cooling element is cycled on and off. For instance, rather than simply turning on the heating until the temperature rises to 40° F. and then turning the heating off, in certain embodiments of the invention the heat is turned on continuously at one threshold (e.g., 30° F.) and then turned on with a 50% duty cycle (e.g., 5 seconds on, 5 seconds off) when the temperature sensor reads 35° F., with this state being maintained until the sensor reads 40° F., at which point heating is turned completely off. Similar use of multiple thresholds and cycling may be used in connection with the cooling portion of the temperature maintenance, in each case with the "on" portion of the cycling becoming less frequent as the measure temperature gets closer to the target temperature range. Use of such cycling is believed to be more efficient in many cases, e.g., where it is anticipated that the activation of the other internal circuitry of system 101 will be generating heat, which will cause the internal temperature of the system 101 to increase.

In this regard, the use of a microprocessor-based temperature management system allows additional flexibility that is not generally available with conventional techniques. For instance, rather than being fixed, at least some of the thresholds at which heating turns on, heating turns off, cooling turns on, cooling turns off, cycling begins, or the cycling period changes preferably are variable based on system conditions and other sensor inputs. Thus, for instance, in addition to internal temperature sensor 207, system 101 or 200 preferably also includes an input for a sensor that is mounted outside of the cabinet 202 for measuring the environmental temperature in which system 101 or 200 is mounted. For example, if such an external temperature sensor indicates a very hot temperature (e.g., where system 101 or 200 is mounted in the trunk of an automobile), then cooling preferably is activated at a lower temperature than if such external sensor indicates a cooler temperature. Similarly, thresholds preferably are modified, added and/or deleted depending upon whether internal and/or external temperature sensor readings indicate an increasing or a decreasing temperature trend (i.e., historical data), as well as the current readings of such sensors. In a still further embodiment of the invention, thresholds are added, modified and/or deleted using a learning-based algorithm that tracks the internal temperature responses to various heating and cooling scenarios under differing conditions (e.g., different internal and external temperature readings and/or different recording conditions). Neural networks and similar techniques are available for performing such processing.

In addition to the foregoing, the present invention provides for pre-heating of system 101 or 200 under certain circumstances. Specifically, if either an engine block heater or a battery charger is detected in use, system 101 or 200 initiates a heater (e.g., the Peltier element or any other solid state heating device) to keep the temperature of system 101 or 200 above a minimum threshold (e.g., a temperature from 30 to 40° F.) so that system 101 or 200 is immediately ready to be used upon vehicle ignition. This is very important in colder climates where vehicles are typically connected when not in use (i.e., parked), to a source of AC power to either keep the vehicle's battery charged with a battery charger connected, or, with a vehicle connected to an engine block heater or compartment heater or a combination of the block heater with internal passenger compartment (cabin) heater, with or without the presence of a battery charger.

In order to exploit the auxiliary power source and derived knowledge of the environmental state, an embodiment of the invention has an internal microprocessor logic controller that features a specific lead that, when connected to a source of +12 VDC, puts the recorder into a heating mode. This is an important feature because if the recorder was set in this pre-heat mode for any extended period of time without having the vehicle's battery being charged, or using a separate power supply in conjunction with the configuration, the system will not accomplish this preheat function and will drain the vehicle's battery.

Figure 8:
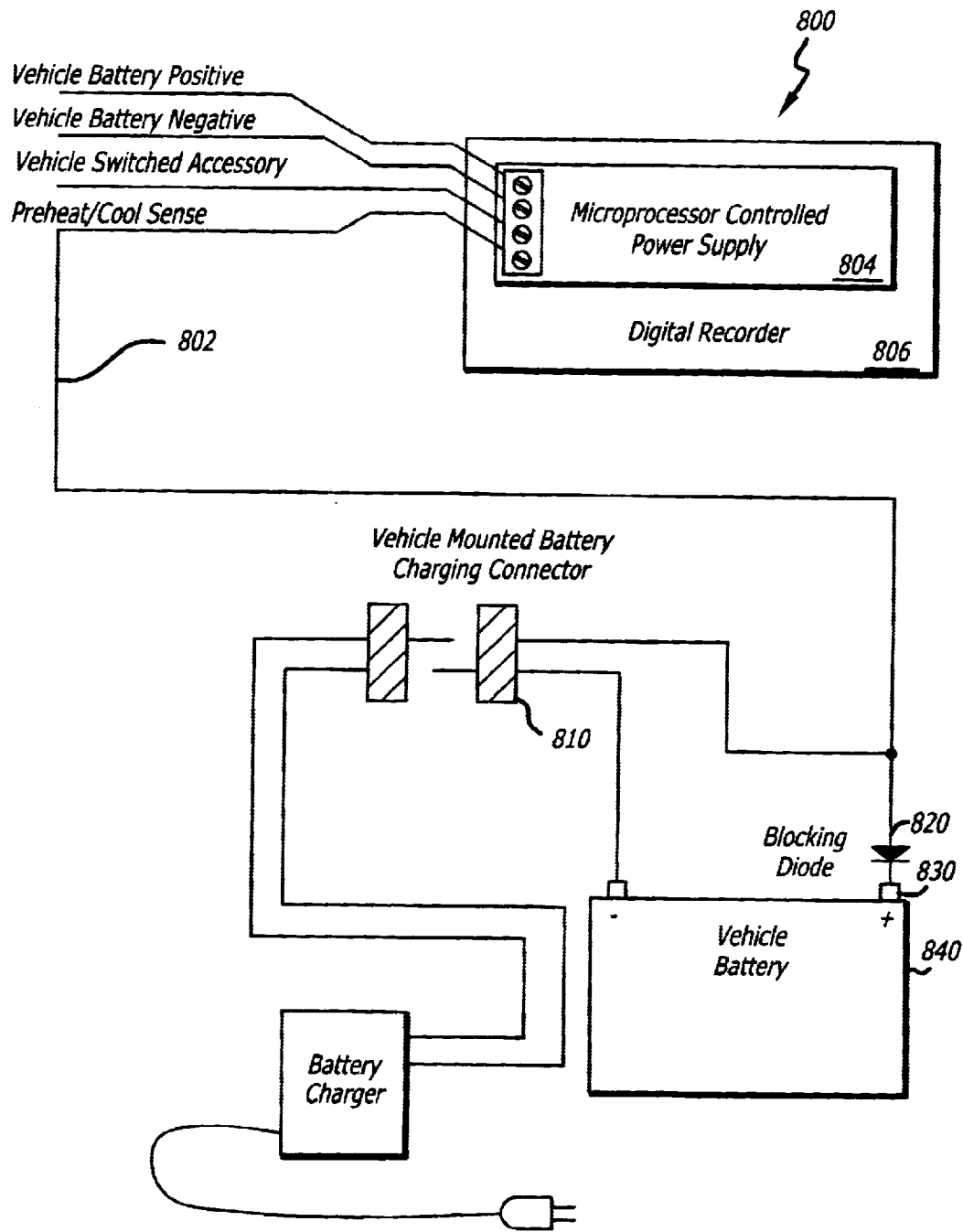
FIG. 8 illustrates a schematic of the system sensing the application of an external battery charger.

FIG. 8 illustrates an arrangement 800 in which a preheat/cool sense line 802 is connected from blocking diode 820, in order to prevent a false read from battery 840 when no charger is connected, to the microprocessor-controlled power supply 804 of the system 806 (which is may incorporate any of the features described above for systems 101 or 200 or which may be any other electronic or non-electronic device). A vehicle-mounted, battery-charging connector 810 connects to the positive and negative terminals of the battery 840, through blocking diode 820 to positive terminal 830. During any time when preheat/cool sense line 802 detects a charging voltage, microprocessor-controlled power supply 804 executes a process of turning on the heater whenever the system's internal temperature drops below the minimum threshold temperature (e.g., 30° F.).

Figure 9:
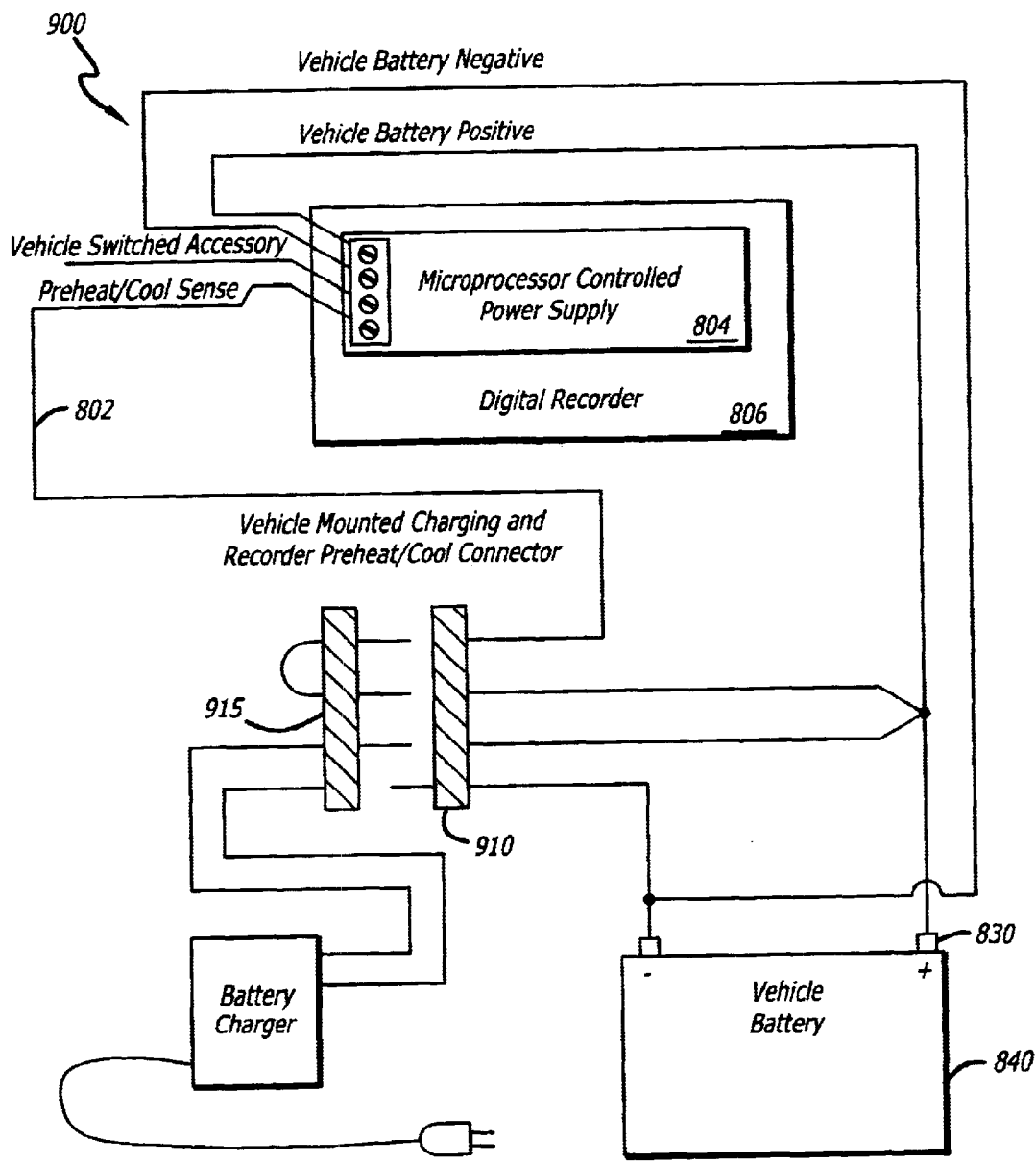
FIG. 9 illustrates an alternative schematic of the system sensing the application of an external battery charger.
Figure 10B:
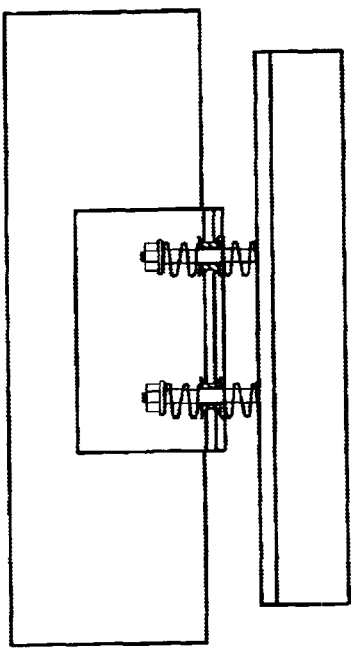
FIG. 10B illustrates a side view of the suspension system of an embodiment of the present invention.
Figure 10A:
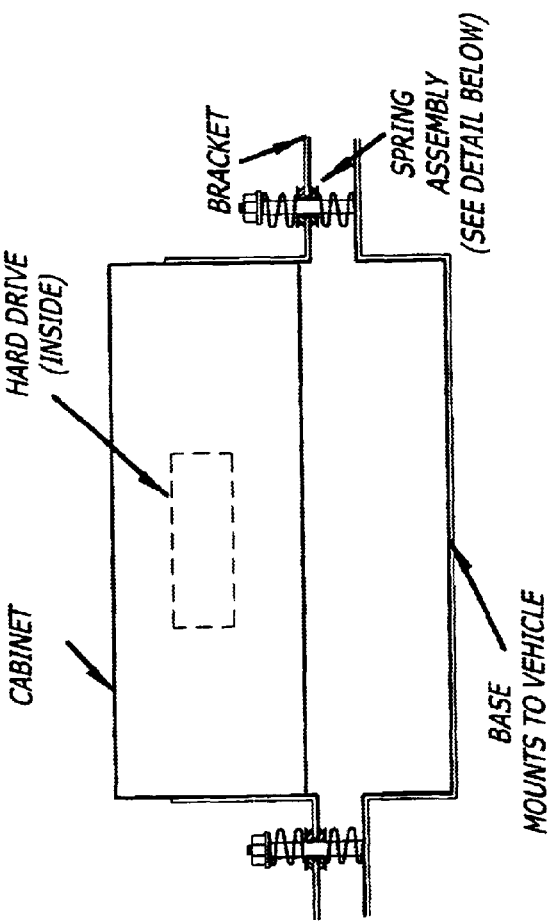
FIG. 10A illustrates an end view of the suspension system of an embodiment of the present invention.
Figure 10C:
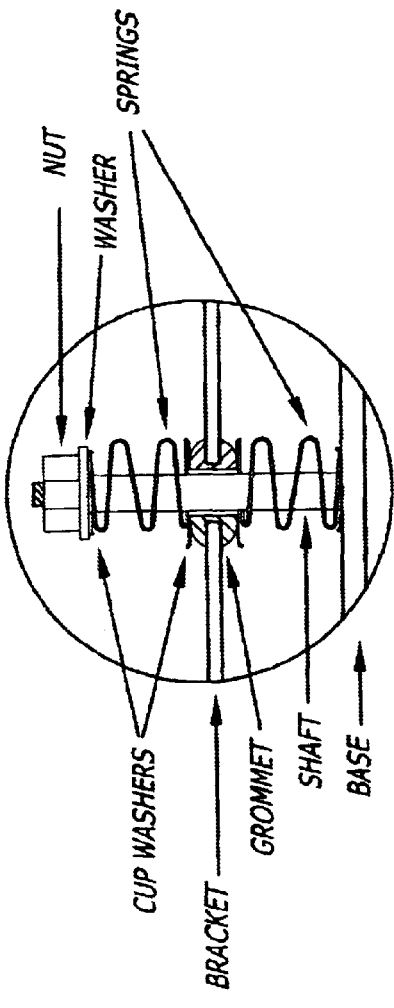
FIG. 10C illustrates a side view of the spring assembly of the suspension system of an embodiment of the present invention.

FIG. 9 illustrates an embodiment 900 in which a preheat/cool sense line 802 is connected to the microprocessor controlled power supply 804 of the system 806 where a vehicle-mounted, battery-charging and recorder preheat connector 910 is used. In this embodiment, the connector, or plug, 915 closes the circuit for the preheat sense line 802 when the two halves are mated.

Figure 11A:
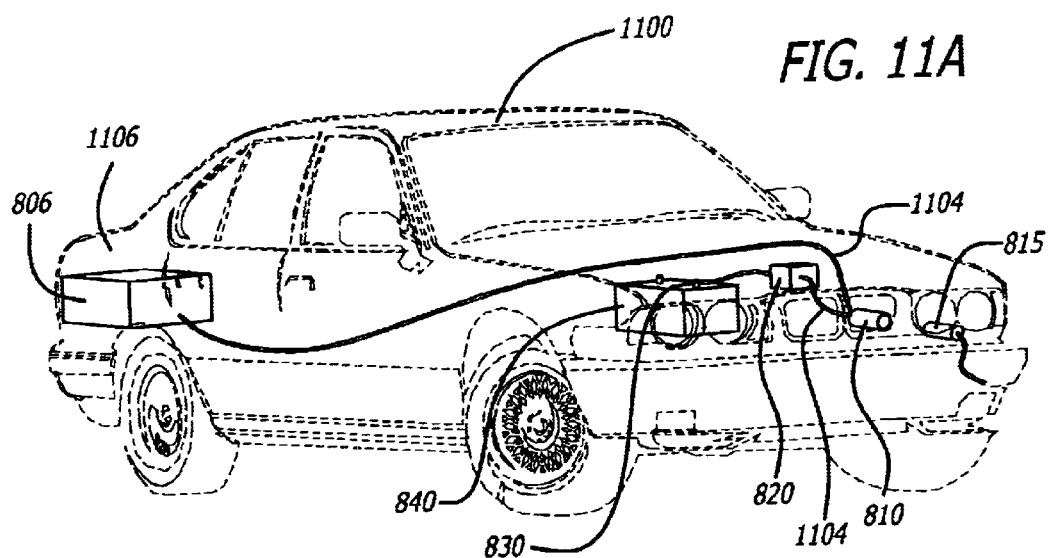
FIG. 11A illustrates an exemplary layout of an automobile using the external battery charger sensing circuit shown in FIG. 8.

FIG. 11A illustrates the layout for an automobile 1100 that utilizes the battery-charging detector shown in FIG. 8 and discussed above. As shown, battery-charging connector 810 is mounted on vehicle 1100 and receives external connector 815, which in turn generally would be connected to a battery charger (not shown in FIG. 11A). The positive wire 1104 from connector 810 connects to the positive terminal 830 of vehicle battery 840 through blocking diode 820 and also connects to digital video recorder 806 which is mounted in trunk 1106 of vehicle 1100. In the configuration shown in FIG. 11A, only the positive power line is illustrated, with all negative power lines being attached to the vehicle's ground. Needless to say, a similar layout may be employed with respect to the wiring diagram shown in FIG. 9, although no blocking diode 820 would be required in such an embodiment.

It is noted that similar techniques to those illustrated in FIGS. 8 and 9 may be used to heat the system 806 upon a detection of engine block heating. In the event that AC voltage is provided to an engine block heater, the AC may be first converted to DC for input to sense line 802 and/or the AC may be used to operate the heating element of device 806 (if an AC heating element is provided) and/or to maintain power to the vehicle's electrical system and/or recorder, so as to prevent depletion of the vehicle battery. In certain embodiments only the thermostatic functions are powered from the vehicle battery and the actual heating is powered from the externally input power source (e.g., engine block heater or battery charging power line), thereby not resulting in any significant car battery drain.

Figure 11B:
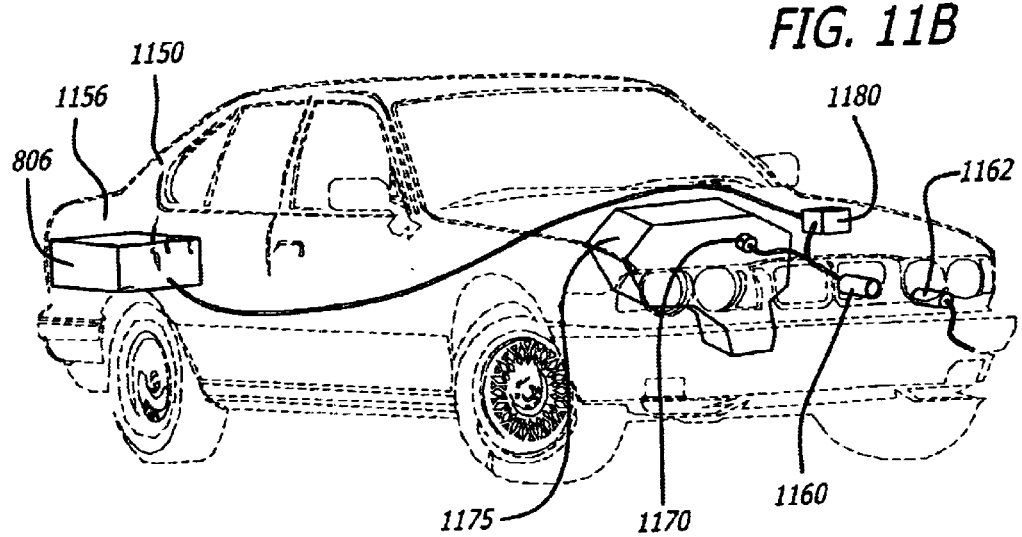
FIG. 11B illustrates an exemplary layout for an automobile using an engine block heater sensing circuit.

FIG. 11B illustrates the layout of an automobile 1150 that utilizes the foregoing engine-block-heater detector. As shown, a vehicle-mounted socket 1160 accepts an external plug 1162. Plug 1162 carries two wires that provide an AC voltage. That AC voltage is carried to engine block heater 1170 which is attached to the vehicle's engine 1175 and also to an AC-to-DC converter 1180. The DC voltage produced by converter 1180 then is provided to the input sense line of digital video recorder 806 which is mounted in trunk 1156 of vehicle 1150. As a result, the input sense line of digital video recorder 806 generally only will be high when external plug 1162 is mated with vehicle-mounted socket 1160 (i.e., when the engine block is being heated).

Shock/Vibration Isolation

In the preferred embodiments of the invention the system 101 or 200 is mounted, or fixedly attached, to the carrier vehicle in which it is to be used (e.g., in the vehicle's trunk or radio compartment). In certain embodiments, such as for use on a motorcycle, it is preferable to utilize a suspension mount in which system 101 or 200, or at least the more sensitive components thereof, are isolated from vibration and shock.

A passive mechanical suspension of embodiments of the present invention is illustrated in FIGS. 12A, 12B and 12C where the system cabinet or housing is supported by four sets of springs, two on each lateral side. The base of the assembly is fastened to the carrier vehicle. Angle brackets are mounted to the system cabinet. The bottoms of those brackets are parallel to the flange on the base. Each spring assembly consists of a shaft that is mounted to the flange on the base. This shaft passes through a hole in the bracket. The bracket is suspended by springs between the flange on the base and the washer at the top of the shaft. A loose fitting rubber grommet is placed in the hole of the bracket to prevent the metal of the bracket from touching the metal of the shaft. There is no load on the grommet so very little vibration is transmitted from the shaft to the bracket. There are also small cup washers at the end of each spring to keep the springs centered. Under particularly extreme conditions of vehicular motion, the springs may reach their full compression limit and transfer a brief, but not disabling, shock to the system. Otherwise, the springs will tend to isolate system 101 or 200 from shock or vibration, at least vertical shock and vibration.

Operational Use

The recording processing of the present invention is configurable and may respond to a number of different input conditions. Recordings are started manually or automatically depending upon any number of events including: ignition line sense, chase light switch, siren switch, airbag deployment sensor signal, portable panic button or other input trigger signal or alarm condition activation. At the option of the operator, the system may be preprogrammed to record continuously, may record only contemporaneously with the activation of a trigger signal or alarm input or may record a predetermined period of time before trigger signal activation, during the trigger signal activation, and a predetermined time period after the trigger signal input has stopped, all using the built-in ring buffer 180, preferably with one ring buffer operating per connected camera.

The embodiments of the present invention begin recording at an available hard disk sector upon the initiation of a trigger, and no human intervention is necessary, although a manual start button or switch may be provided. The time and date index of the hard drive can allow a new sector to be recorded. In order to satisfy an agency's need to maintain the current "alarm only" recording functionality like that of conventional VCR-based systems, an embodiment of the present invention is configured to maintain the current "alarm only" recording functionality using the DIP switches. In one example, the resulting system includes a built-in video ring buffer illustrated in FIG. 6B that allows the system to capture pre-incident, pre-siren/chase-light activation video, video, and this video is then captured and stored on the hard disk with the actual running of the alarm/siren/chase-light, as well as for a period after these devices are turned off. In this embodiment, the system provides critical information before, during and after an incident. Similarly, such a system can be utilized to capture video and audio prior to deployment of an airbag, by utilizing an airbag deployment sensor as one of the trigger signal inputs.

Referring again to FIG. 2, the electronic components within the chassis are connected to an appropriate source of power that, in the case of carrier vehicle embodiments, is a voltage supply in the range of 9.5 to 18 or 38 VDC 259. When only monitoring for ignition start, current used by a system according to the preferred embodiment can be low, e.g., less than 0.01 milliamp (mA) at 13.8 VDC. Upon detection of a source of ignition start, the system's microprocessor preferably will start up, perform a self-test, and initiate the recording process. Recording preferably will be at 30 fps, real time, with four cameras and two audio channels and provide 24 to 30 hours of recording time when using a 75 GB hard drive. The system preferably is capable of a multiplexed (traditionally called time-lapse) video recording mode. This type of recording, while not as useful for law enforcement and high level security, extends the duration for a fixed disk medium by recording one frame from one camera at 0.25, 0.5 or 1.0 second intervals for example (i.e., 1–4 fps), or any rate up to 7.5 frames per second, rather than at the real-time standard of 30 fps. One feature of this system is that should multiplexed recording be selected at the time of installation, an alarm input trigger may cause the recording frame rate of an associated camera to increase to full-frame, real-time, 30 frames per second, in order to cover the duration of the alarm or trigger signal as well as a predetermined and pre-set time thereafter.

In certain specific embodiments, once the system has started recording a driver will be prompted to enter an operator ID or badge number. While failure to enter an ID or other identifying number or the operator will not hinder recording, if no badge number has been entered, the video character overlay that appears on the monitor connected to the monitor 1 output will disappear after two minutes (or at a preselected default time). Alternatively, the in-car general-purpose computer with which the system is interfaced may provide such ID or badge number.

Should relay/contact interfaces be wired to or placed in communication with the auxiliary input terminals of the system, these trigger signal inputs will simply "mark" the trigger event onto the recorded video, using for example any of the techniques described above. This function aids in the retrieval of scenes of interest. Status inputs include siren on, chase-lights on, brake pushed, and the like. If connected to the video overlay character generator, the status of these inputs are displayed along with retrieved data from a radar gun or other data collection system. Should a second NTSC display or LCD be connected to the monitor output 2, any programmed and corresponding live views of these triggering points will be called-up and displayed on this second monitor. In normal use, the NTSC/PAL monitor 1 output will display the following: (1) live video from up to four cameras These views may be full screen, full screen and sequenced, or in quad, or split in two showing 2 cameras at a time; (2) status of the system, e.g., recording, recording stop, playback, fast forward play, reverse play, and fast reverse play; (3) end of recording loop, if so programmed, alerting to a disk full situation; (4) rewrite, if so programmed, indicating to the operator that there remains 20% of free hard disk space, and that a rewrite of the oldest video/audio data with the latest will occur if the hard disk is not changed; (5) disk full; (6) hard disk missing; (7) overlay of radar gun information, GPS information, and the like; (8) overlay of status of siren, brake, chase light (i.e., up to eight trigger/monitored signals/inputs in the preferred embodiment); (9) overlay of time, date, camera description, trigger signal information, driver ID number, vehicle ID number and the like; (10) vehicle's speed when moving; (11) the number of the 5 minute recorded video clip sequences; and (12) the number of the trigger events (when the system is in either the alarm only mode or pre- and/or post-alarm event mode recording).

In certain embodiments of the invention, system 200 uses one of its outputs 231 to signal a data terminal 280 or other device regarding the state of the functionality of the recording system 200, such as whether system 200 is recording at all or whether it is properly recording. Preferably, such information then is forwarded by terminal 280 to a remote monitoring station with which terminal 280 is in wireless communication. More preferably, such remote monitoring station utilizes a Records Management System (RMS) for tracking the status of patrol cars or other vehicles, and the system recording status is stored in the RMS. In addition, system 200 or terminal 280 optionally also provide an audio and/or visual alarm to the in-vehicle operator (e.g., police officer) if the system 200 is not recording or is not recording properly. Preferably, the output recording status signal is "high" to indicate proper recording and "low" otherwise, so that a loss of power to, or similar disablement of, system 200 will result in a low signal.

System Environment

Suitable hardware for use in implementing the present invention may be obtained from various vendors. Various types of hardware may be used depending upon the size and complexity of the tasks. Either a general-purpose computer system or a special-purpose computer may be used. In particular, unless otherwise indicated to the contrary, any of the functionality described above can be implemented in software, hardware, firmware or any combination of these, with the particular implementation being selected based on known engineering tradeoffs.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

Additional Considerations

In certain embodiments of the invention, it may be preferable to limit the user's ability to turn on and/or off the recording mode. Thus, for example, the duration of pre- or post-event recording might be pre-set or DIP switches for setting that duration might be enclosed within the cabinet 202 housing the system (101 or 200).

An embodiment of the system of the present invention may be configured to require password access to review video, stop the recordings, and otherwise interact with the system to reduce the risk of inadvertently harming the recordings. Advanced trigger event searches may be facilitated by direct entry of a specific time and date in the vehicle, as well as by retrieving video in 5-minute system segments by simply pressing the rewind button as needed, where the system user is in fact allowed access to this function. In addition, recorded incident triggers such as activation of the chase lights, may also be used to search the video and audio data, rather than just "fast rewind/fast play" of video as is traditional with VCR technology. Incident triggers not only start and stop the recording, with pre- and post-alarm video capture if so programmed, but if the system is in continuous record mode, the addition of these alarm/system input sensors preferably marks the video, and when in playback mode with password authorization, all video corresponding to these "events" may be easily retrieved in the order that they were collected.

The preferred embodiment of the present invention features eight alarm inputs and eight control relay outputs 231, as well as two NTSC/PAL video signal outputs 234, 236 that allow for flexibility in system configuration and applications that traditional VCR technology typically does not provide. Alarm inputs indicate via video overlay conditions of parameters such as brake light operation, siren and chase light activation etc. In one example, the brake light input will not start recording, but the alarm inputs designated for chase light and siren will, based on the system programming and alarm assignment made at the time of the installation via a heads up display and using the device's control keyboard and accessing password protected system set up menus.

The relay output may be configured to provide an external remote visual indicator of record operation. This is particularly important when used on-board motorcycles as in most cases and unlike the traditional patrol car, bus or train, there is no room to add an LCD system monitor. These relays may also be programmed to control video camera zoom features, focus and iris controls if so programmed, as well as trigger automatic video transmission devices, buzzers, and the like, for use in video alarm signal transmission off site or for monitoring in more advanced video management situation, such as in an airplane installation.

Referring again to FIG. 1B, for those embodiments where wavelet-based compression is used, the analog video and audio signals 102 are processed by the A/Ds 112 with the resulting digital signals being multiplexed 110 and transmitted to the wavelet component 116 for audio compression 193 and video compression 192, further multiplexing and synchronization 190. Wavelet compression works by analyzing an image and converting it into a set of mathematical expressions that can then be decoded or decoded by the receiver for viewing after retrieval. While alternative video compression techniques such as Moving Picture Experts Group (MPEG) or Joint Photographic Experts Group (JPEG) may be used in the various embodiments of the present invention, the wavelet component, when compared to MPEG and JPEG methods, compresses the video signals to sizes more readily managed by the system. In some general cases, a wavelet-compressed image is as small as about one-fourth the size of a similar-quality image using the JPEG method. The system may instead incorporate any other compression technologies, such as any new techniques as compression technology evolves. After being processed by the wavelet component, the digitized and compressed video and audio signals are transmitted to a removable IDE hard disk for storage.

While one removable hard disk is shown in FIG. 2, a plurality of digital recording media 118 is usable in storing the compressed data depending on the volume of digital recordings necessary for a particular embodiment of the system. The digital recording media is preferably within the control board housing but can be attached externally to the housing. In one example, the IDE hard disk 118 has 75 gigabytes in storage capacity. Additional recording time is accomplished by the addition of one or more additional external hard drives. Where longer-term or additional storage is required onboard the carrier vehicle, one or more additional removable IDE hard drive arrays may be placed in communication with the coded output of the wavelet component. It is envisioned that other digital recording media such as compact disk recordable (CD-R) optical storage technologies, memory sticks and the like are useable in conjunction with, or in place of, the one or more removable IDE hard disks.

Embodiments of the present invention may permit transfer of recorded video and audio data to a central location via a wireless (e.g., cellular-based) communications system or a direct wireless link, using appropriate interfaces incorporated either within a system according to the present invention or within a general-purpose computer or other device with which such system is in communication. Such transfers may consist of full motion video, selected frames or any combination of the two, depending upon the needs of the users and the available bandwidth. Such transfers may be used for reviewing the video and audio in real-time or for permanent archiving.

In the preferred embodiments of the invention, power to each of the input and output devices attached to the system 101 of the present invention is switched on and off in a similar manner to that applied to system 101. More preferably, a control signal from system 101 switches the power off to such peripheral devices whenever system 101 is in standby mode, waiting for an ignition sense signal. Such an arrangement can further prevent unnecessary power drain of the carrier vehicle's battery.

Also, in the above-described embodiments the video recorder and other components of a system according to the present invention sometimes are said to be mounted in, on or to a vehicle. It should be understood that these terms are used interchangeably and are not intended to indicate that such components are within or outside of the vehicle unless expressly specified.

Preferably, a system according to the present invention for use in a mobile vehicle is provided with a wireless connection to a central base station (e.g., for transmitting license plate information to the base station and/or for receiving trigger signals, status data and other information from the base station. The wireless transceiver may, for example, be incorporated into the video recorder, incorporated into the general-purpose in-vehicle computer or provided as a separate component in the system. In any case, hardware and software for implementing such wireless connectivity is well-understood and therefore is not discussed in detail herein.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus comprising:
   (a) a temperature-sensitive electronic device;
   (b) mounting means for mounting said temperature-sensitive electronic device in a motor vehicle;
   (c) heating means for heating said temperature-sensitive electronic device;
   (d) detection means for detecting at least one of: whether an automobile battery within said automobile is being charged, or whether an engine block within said automobile is being heated; and
   (e) control means for controlling said heating means, wherein said control means initiates a heating process of heating temperature-sensitive electronic device upon a detection by said detection means.

2. An apparatus according to claim 1, wherein said control means comprises a temperature detection means for detecting a temperature within said temperature-sensitive electronic device, and wherein the heating process comprises activating said heating means if the detected temperature is less than a specified threshold.

3. An apparatus according to claim 2, wherein the specified threshold is approximately 30 degrees Fahrenheit.

4. An apparatus according to claim 1, wherein said detection means comprises a power line from a battery charger.

5. An apparatus according to claim 4, wherein the power line taps a connection between the battery charger and the automobile battery, wherein a diode is included in the connection between the battery charger and the automobile battery, and wherein the power line taps the connection on a side of the diode that connects to the battery charger.

6. An apparatus according to claim 1, wherein said detection means comprises a pair of mating plugs, at least one of which having a power loop-back from one pin to another.

7. An apparatus according to claim 1, wherein said temperature-sensitive electronic device comprises a video recorder.

8. An apparatus according to claim 1, wherein said temperature-sensitive electronic device is mounted in a trunk of the motor vehicle.

9. An apparatus according to claim 1, wherein said heating means comprises a solid-state heat pump.

10. An apparatus according to claim 9, wherein said heating means comprises a Peltier element.

11. An apparatus according to claim 1, wherein said temperature-sensitive electronic device comprises a hard disk drive.

12. An apparatus according to claim 1, wherein said temperature-sensitive electronic device is located remotely from said engine block.

13. An apparatus according to claim 1, wherein an engine block heater is used to heat the engine block within said automobile, and wherein said heating means is a different device than said engine block heater.

* * * * *